(12) United States Patent
Devoe et al.

(10) Patent No.: US 10,806,214 B2
(45) Date of Patent: Oct. 20, 2020

(54) FOOTWEAR FLUID-FILLED CHAMBER HAVING CENTRAL TENSILE FEATURE

(71) Applicant: Nike, Inc., Beaverton, OR (US)

(72) Inventors: Devonne Devoe, Hillsboro, OR (US); Benjamin J. Monfils, Beaverton, OR (US); Lee D. Peyton, Tigard, OR (US); Danielle L. Taylor, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 822 days.

(21) Appl. No.: 13/790,501

(22) Filed: Mar. 8, 2013

(65) Prior Publication Data

US 2014/0250728 A1    Sep. 11, 2014

(51) Int. Cl.
*A43B 13/18*    (2006.01)
*A43B 7/14*    (2006.01)
(Continued)

(52) U.S. Cl.
CPC ............ *A43B 13/189* (2013.01); *A43B 7/144* (2013.01); *A43B 7/148* (2013.01); *A43B 13/20* (2013.01); *B33Y 80/00* (2014.12)

(58) Field of Classification Search
CPC ....... A43B 13/00; A43B 13/18; A43B 13/189; A43B 13/188; A43B 13/20; A43B 7/144;
(Continued)

(56) References Cited

U.S. PATENT DOCUMENTS 836,364 A * 11/1906 Busby .................... A43B 13/20
                                                        36/29
1,506,975 A *  9/1924 Cooney ................. A43B 13/20
                                                        36/28
(Continued)

FOREIGN PATENT DOCUMENTS

CH            702184 A2     5/2011
CN           1386052 A    12/2002
(Continued)

OTHER PUBLICATIONS

Oxford Living Dictionary. Oxford University Press, n.d. Web. May 23, 2017.*
Japan Patent Office, Notice of Reasons for Rejection for JP Application No. 2015-561631, dated Nov. 21, 2016.
(Continued)

*Primary Examiner* — Nathan E Durham
*Assistant Examiner* — Abby M Spatz
(74) *Attorney, Agent, or Firm* — Honigman LLP; Mattheq H. Szalach; Jonathan P. O'Brien

(57) ABSTRACT

An article of footwear includes a sole structure including a chamber for receiving a pressurized fluid, the chamber having a top portion, a bottom portion, and side portions around a periphery of the chamber. The sole structure also includes a central structure located in a central portion of the chamber between opposing side portions of the chamber, such that the chamber is devoid of additional structures in a surrounding region around the central structure and extending from the central structure to the side portions of the chamber. On all sides of the central structure, a dimension of the surrounding region between the central structure and the nearest side portion is one third or more of a span across the chamber between opposing side portions.

22 Claims, 16 Drawing Sheets

(51) Int. Cl.
*A43B 13/20* (2006.01)
*B33Y 80/00* (2015.01)

(58) Field of Classification Search
CPC ....... A43B 7/148; A43B 7/1425; A43B 7/145; B33Y 80/00
USPC .......................... 36/102, 103, 29, 105, 35 B
See application file for complete search history.

(56) References Cited

U.S. PATENT DOCUMENTS

| | | | |
|---|---|---|---|
| 2,532,742 A * | 12/1950 | Stoiner | A43B 21/28 36/35 B |
| 2,645,865 A * | 7/1953 | Town | A43B 17/03 36/153 |
| 3,205,106 A | 9/1965 | Cross et al. | |
| 3,335,045 A * | 8/1967 | Post | A47C 27/081 156/289 |
| 4,183,156 A | 1/1980 | Rudy | |
| 4,187,620 A * | 2/1980 | Selner | A43B 13/182 36/28 |
| 4,219,945 A | 9/1980 | Rudy | |
| 4,271,606 A * | 6/1981 | Rudy | A43B 13/223 36/29 |
| 4,340,626 A | 7/1982 | Rudy | |
| 4,342,158 A * | 8/1982 | McMahon | A43B 21/26 36/114 |
| 4,817,304 A * | 4/1989 | Parker | A43B 13/20 36/114 |
| 4,936,029 A | 6/1990 | Rudy | |
| 4,970,807 A * | 11/1990 | Anderie | A43B 1/0072 36/28 |
| 5,005,300 A * | 4/1991 | Diaz | A43B 1/0072 36/114 |
| 5,025,575 A * | 6/1991 | Lakic | A41D 19/001 36/29 |
| 5,042,176 A | 8/1991 | Rudy | |
| 5,131,174 A * | 7/1992 | Drew | A43B 21/28 36/29 |
| 5,199,191 A * | 4/1993 | Moumdjian | A43B 13/203 36/25 R |
| 5,220,737 A * | 6/1993 | Edington | A43B 13/20 36/114 |
| 5,343,639 A * | 9/1994 | Kilgore | A43B 13/183 36/27 |
| 5,353,459 A * | 10/1994 | Potter | A43B 13/206 12/146 R |
| 5,363,570 A * | 11/1994 | Allen | A43B 13/189 36/114 |
| 5,369,896 A * | 12/1994 | Frachey | A43B 1/0072 36/114 |
| 5,543,194 A | 8/1996 | Rudy | |
| 5,564,202 A * | 10/1996 | Hoppenstein | A43B 13/18 36/25 R |
| 5,572,804 A * | 11/1996 | Skaja | A43B 13/181 36/28 |
| 5,575,088 A * | 11/1996 | Allen | A43B 13/20 36/153 |
| 5,713,141 A * | 2/1998 | Mitchell | A43B 13/203 36/29 |
| 5,718,063 A * | 2/1998 | Yamashita | A43B 1/0072 36/28 |
| 5,741,568 A * | 4/1998 | Rudy | A43B 7/141 36/28 |
| 5,815,950 A * | 10/1998 | Wang | A43B 1/0072 36/137 |
| 5,842,291 A * | 12/1998 | Schmidt | A43B 13/20 36/28 |
| 5,901,467 A * | 5/1999 | Peterson | A43B 13/20 36/28 |
| 5,918,383 A * | 7/1999 | Chee | A43B 1/0009 36/28 |
| 5,930,918 A * | 8/1999 | Healy | A43B 13/18 36/29 |
| 5,933,983 A * | 8/1999 | Jeon | A43B 21/28 36/27 |
| 5,952,065 A | 9/1999 | Mitchell et al. | |
| 5,956,869 A * | 9/1999 | Kim | A43B 13/20 36/28 |
| 5,976,451 A | 11/1999 | Skaja et al. | |
| 5,987,781 A * | 11/1999 | Pavesi | A43B 13/20 36/29 |
| 5,993,585 A * | 11/1999 | Goodwin | A43B 7/144 156/145 |
| 6,009,637 A * | 1/2000 | Pavone | A43B 13/14 36/28 |
| 6,013,340 A | 1/2000 | Bonk et al. | |
| 6,029,962 A | 2/2000 | Shorten et al. | |
| 6,082,025 A | 7/2000 | Bonk et al. | |
| 6,098,313 A * | 8/2000 | Skaja | A43B 13/181 36/28 |
| 6,119,371 A | 9/2000 | Goodwin et al. | |
| 6,127,026 A | 10/2000 | Bonk et al. | |
| 6,158,149 A * | 12/2000 | Rudy | A43B 7/144 36/28 |
| 6,170,173 B1 * | 1/2001 | Caston | A43B 13/203 36/141 |
| 6,176,025 B1 * | 1/2001 | Patterson | A43B 5/001 36/28 |
| 6,203,868 B1 | 3/2001 | Bonk et al. | |
| 6,321,465 B1 | 11/2001 | Bonk et al. | |
| 6,354,020 B1 * | 3/2002 | Kimball | A43B 13/203 36/135 |
| 6,385,864 B1 * | 5/2002 | Sell, Jr. | A43B 13/181 36/29 |
| 6,453,577 B1 * | 9/2002 | Litchfield | A43B 13/203 36/29 |
| 6,457,262 B1 * | 10/2002 | Swigart | A43B 13/203 36/144 |
| 6,510,624 B1 * | 1/2003 | Lakic | A43B 5/0407 36/28 |
| 6,589,614 B2 * | 7/2003 | Stubblefield | A43B 13/20 36/29 |
| 6,598,251 B2 * | 7/2003 | Habboub | B60N 2/242 297/452.42 |
| 6,694,642 B2 * | 2/2004 | Turner | A43B 13/143 36/28 |
| 6,745,499 B2 * | 6/2004 | Christensen | A43B 13/20 36/29 |
| 6,777,062 B2 | 8/2004 | Skaja | |
| 6,796,056 B2 * | 9/2004 | Swigart | A43B 7/144 36/141 |
| 6,883,253 B2 * | 4/2005 | Smith | A43B 7/141 36/28 |
| 6,946,050 B2 * | 9/2005 | Dojan | A43B 13/203 12/142 R |
| 7,000,334 B2 * | 2/2006 | Gillespie | A43B 13/184 36/28 |
| 7,000,335 B2 * | 2/2006 | Swigart | A43B 7/144 36/29 |
| 7,020,988 B1 * | 4/2006 | Holden | A43B 7/1425 36/141 |
| 7,033,666 B2 | 4/2006 | Skaja | |
| 7,051,456 B2 * | 5/2006 | Swigart | A43B 13/203 36/29 |
| 7,070,845 B2 | 7/2006 | Thomas et al. | |
| 7,096,605 B1 * | 8/2006 | Kozo | A43B 7/08 36/103 |
| 7,128,796 B2 * | 10/2006 | Hensley | A43B 13/20 156/196 |
| 7,131,218 B2 * | 11/2006 | Schindler | A43B 13/187 36/29 |
| 7,152,343 B2 * | 12/2006 | Whatley | A43B 13/20 36/29 |
| 7,159,339 B2 * | 1/2007 | Mathieu | A43B 3/0036 36/3 B |
| 7,200,955 B2 * | 4/2007 | Foxen | A43B 7/1425 36/25 R |

(56) References Cited

U.S. PATENT DOCUMENTS

| | | | | |
|---|---|---|---|---|
| 7,210,249 B2* | 5/2007 | Passke | A43B 7/081 | 36/29 |
| 7,225,491 B2* | 6/2007 | Reed | A43B 7/1425 | 12/142 P |
| 7,249,425 B2* | 7/2007 | Wang | A43B 7/144 | 36/29 |
| 7,331,124 B2* | 2/2008 | Meschan | A43B 13/186 | 36/27 |
| 7,386,946 B2* | 6/2008 | Goodwin | A43B 13/20 | 36/28 |
| 7,395,616 B2* | 7/2008 | Fallon | A43B 3/0042 | 36/25 R |
| 7,451,556 B2* | 11/2008 | Harmon-Weiss | A43B 13/20 | 36/29 |
| 7,555,848 B2* | 7/2009 | Aveni | A43B 13/20 | 36/28 |
| 7,574,760 B2 | 8/2009 | Foley et al. | | |
| 7,707,745 B2* | 5/2010 | Schindler | A43B 7/144 | 36/29 |
| 7,941,939 B2* | 5/2011 | Sokolowski | A43B 13/187 | 36/25 R |
| 8,241,450 B2* | 8/2012 | Hensley | A43B 13/20 | 156/145 |
| 8,316,560 B2* | 11/2012 | Caron | A43B 1/0072 | 36/25 R |
| 8,341,857 B2* | 1/2013 | Dojan | A43B 13/20 | 36/28 |
| 8,464,439 B2* | 6/2013 | Monfils | A43B 13/189 | 36/28 |
| 8,978,273 B2* | 3/2015 | Cook | A43B 13/026 | 36/29 |
| 9,021,720 B2* | 5/2015 | Hazenberg | A43B 13/20 | 36/29 |
| 2001/0045026 A1* | 11/2001 | Huang | A43B 17/035 | 36/29 |
| 2002/0088142 A1* | 7/2002 | Levert | A43B 13/182 | 36/27 |
| 2002/0129516 A1* | 9/2002 | Lucas | A43B 3/0063 | 36/35 R |
| 2003/0097767 A1* | 5/2003 | Perkinson | A43B 7/1425 | 36/29 |
| 2004/0154189 A1* | 8/2004 | Wang | A43B 13/026 | 36/28 |
| 2005/0011085 A1* | 1/2005 | Swigart | A43B 7/144 | 36/31 |
| 2005/0039346 A1* | 2/2005 | Thomas | A43B 13/20 | 36/29 |
| 2005/0120590 A1* | 6/2005 | Ellis | A43B 7/144 | 36/29 |
| 2005/0132608 A1* | 6/2005 | Dojan | A43B 13/20 | 36/29 |
| 2006/0016099 A1* | 1/2006 | Marco | A43B 7/1435 | 36/43 |
| 2006/0086003 A1* | 4/2006 | Tseng | A43B 13/20 | 36/29 |
| 2006/0248749 A1* | 11/2006 | Ellis | A43B 3/0005 | 36/28 |
| 2006/0277794 A1* | 12/2006 | Schindler | A43B 7/144 | 36/28 |
| 2006/0277799 A1* | 12/2006 | Lebo | A43B 13/026 | 36/102 |
| 2008/0120870 A1 | 5/2008 | Sussmann | | |
| 2008/0163512 A1* | 7/2008 | Hazenberg | A43B 13/203 | 36/29 |
| 2008/0184595 A1* | 8/2008 | Schindler | A43B 1/0027 | 36/29 |
| 2008/0189982 A1* | 8/2008 | Krafsur | A43B 7/1425 | 36/27 |
| 2008/0289218 A1* | 11/2008 | Nakano | A43B 13/186 | 36/88 |
| 2009/0151195 A1 | 6/2009 | Forstrom et al. | | |
| 2009/0151196 A1* | 6/2009 | Schindler | A43B 13/12 | 36/29 |
| 2009/0158622 A1* | 6/2009 | Cook | A43B 1/0036 | 36/137 |
| 2009/0178301 A1* | 7/2009 | Dojan | A43B 13/20 | 36/29 |
| 2009/0199430 A1* | 8/2009 | Montross | A43B 13/20 | 36/29 |
| 2009/0200661 A1* | 8/2009 | Ellis | A43B 3/0005 | 257/712 |
| 2009/0241377 A1* | 10/2009 | Kita | A43B 13/181 | 36/107 |
| 2009/0288313 A1 | 11/2009 | Rapaport et al. | | |
| 2009/0307925 A1* | 12/2009 | Pfister | A43B 7/223 | 36/28 |
| 2010/0058616 A1* | 3/2010 | Ryoo | A43B 13/182 | 36/102 |
| 2010/0107444 A1* | 5/2010 | Aveni | A43B 13/189 | 36/88 |
| 2010/0107445 A1* | 5/2010 | Aveni | A43B 13/189 | 36/92 |
| 2010/0192409 A1* | 8/2010 | Schindler | A43B 1/0027 | 36/29 |
| 2010/0325914 A1* | 12/2010 | Peyton | A43B 7/144 | 36/29 |
| 2011/0067268 A1 | 3/2011 | Lubart | | |
| 2011/0131831 A1* | 6/2011 | Peyton | A43B 13/20 | 36/29 |
| 2011/0131832 A1* | 6/2011 | Brandt | A43B 13/20 | 36/29 |
| 2011/0162233 A1* | 7/2011 | Shiao | A43B 13/20 | 36/29 |
| 2011/0271552 A1* | 11/2011 | Peyton | A43B 13/20 | 36/29 |
| 2012/0090200 A1* | 4/2012 | Cook | A43B 1/0081 | 36/103 |
| 2013/0160329 A1* | 6/2013 | Peyton | A43B 5/06 | 36/105 |
| 2013/0247411 A1* | 9/2013 | Yang | A43B 13/203 | 36/29 |
| 2013/0276329 A1* | 10/2013 | James | A43B 13/189 | 36/83 |
| 2014/0020264 A1* | 1/2014 | Holt | A43B 13/189 | 36/103 |
| 2014/0230272 A1* | 8/2014 | Feshbach | A43B 13/20 | 36/29 |
| 2014/0230276 A1* | 8/2014 | Campos, II | B29D 35/122 | 36/84 |
| 2014/0250728 A1* | 9/2014 | Devoe | A43B 13/189 | 36/102 |
| 2014/0259748 A1* | 9/2014 | Bernhard | A43B 13/181 | 36/29 |
| 2014/0259749 A1* | 9/2014 | Taylor | B29D 35/122 | 36/29 |
| 2015/0223564 A1* | 8/2015 | Peyton | A43B 13/20 | 36/29 |
| 2015/0257481 A1* | 9/2015 | Campos, II | A43B 13/20 | 36/103 |
| 2015/0257483 A1* | 9/2015 | Meschter | A43B 13/206 | 36/29 |
| 2015/0272272 A1* | 10/2015 | Scofield | A43B 13/206 | 36/29 |

FOREIGN PATENT DOCUMENTS

| | | |
|---|---|---|
| CN | 101309609 A | 11/2008 |
| CN | 101600364 A | 12/2009 |
| CN | 102429401 A | 5/2012 |
| CN | 102711543 A | 10/2012 |
| DE | 135595 C | 6/1901 |
| EP | 0293034 | 11/1988 |
| GB | 2217576 A | 11/1989 |
| JP | H08510656 A | 11/1996 |
| JP | H10327906 A | 12/1998 |
| JP | H11318507 A | 11/1999 |
| JP | 2008528075 A | 7/2008 |

(56) References Cited

FOREIGN PATENT DOCUMENTS

| JP | 2010148915 A | 7/2010 | | |
|---|---|---|---|---|
| JP | 2011251190 A | 12/2011 | | |
| WO | WO-03063629 A1 | 8/2003 | | |
| WO | WO-2007047126 A1 | 4/2007 | | |
| WO | WO-2012005419 A1 | 1/2012 | | |
| WO | WO-2012007093 A1 | 1/2012 | | |
| WO | WO 2012094379 A1 | * | 7/2012 | ........... A43B 13/125 |

OTHER PUBLICATIONS

State Intellectual Property Office, CN Office Action for CN Application No. 201480013046.5, dated Jul. 23, 2016.
State Intellectual Property Office, CN Office Action for CN Application No. 201480013046.5, dated Mar. 7, 2017.
International Searching Authority, International Search Report and Written Opinion for PCT Application No. PCT/US2014/020961, dated Jul. 7, 2014.
European Patent Office, Communication pursuant to Article 94(3) EPC for Application No. 14721567.7, dated Mar. 24, 2017.
Japan Patent Office, Notice of Reasons for Rejection for JP Application No. 2015-561631, dated Mar. 6, 2017.
Korean Patent Office, Office Action for KR Application No. 10-2015-7026980, dated Mar. 30, 2017.
Japan Patent Office, Decision of Rejection for JP Application No. 2015-561631, dated Aug. 7, 2017.
Japan Patent Office, Notice of Reasons for Rejection for JP Application No. 2017-235151, dated Mar. 4, 2019.
European Patent Office, The extended European search report for EP Application No. 19151954.5 dated Apr. 9, 2019.
Korean Intellectual Property Office, Office Action for KR Application No. 10-2018-7024380, dated Jun. 27, 2019.
Korean Intellectual Property Office, Office Action for KR Application No. 10-2018-7024380, dated Feb. 17, 2020.

* cited by examiner

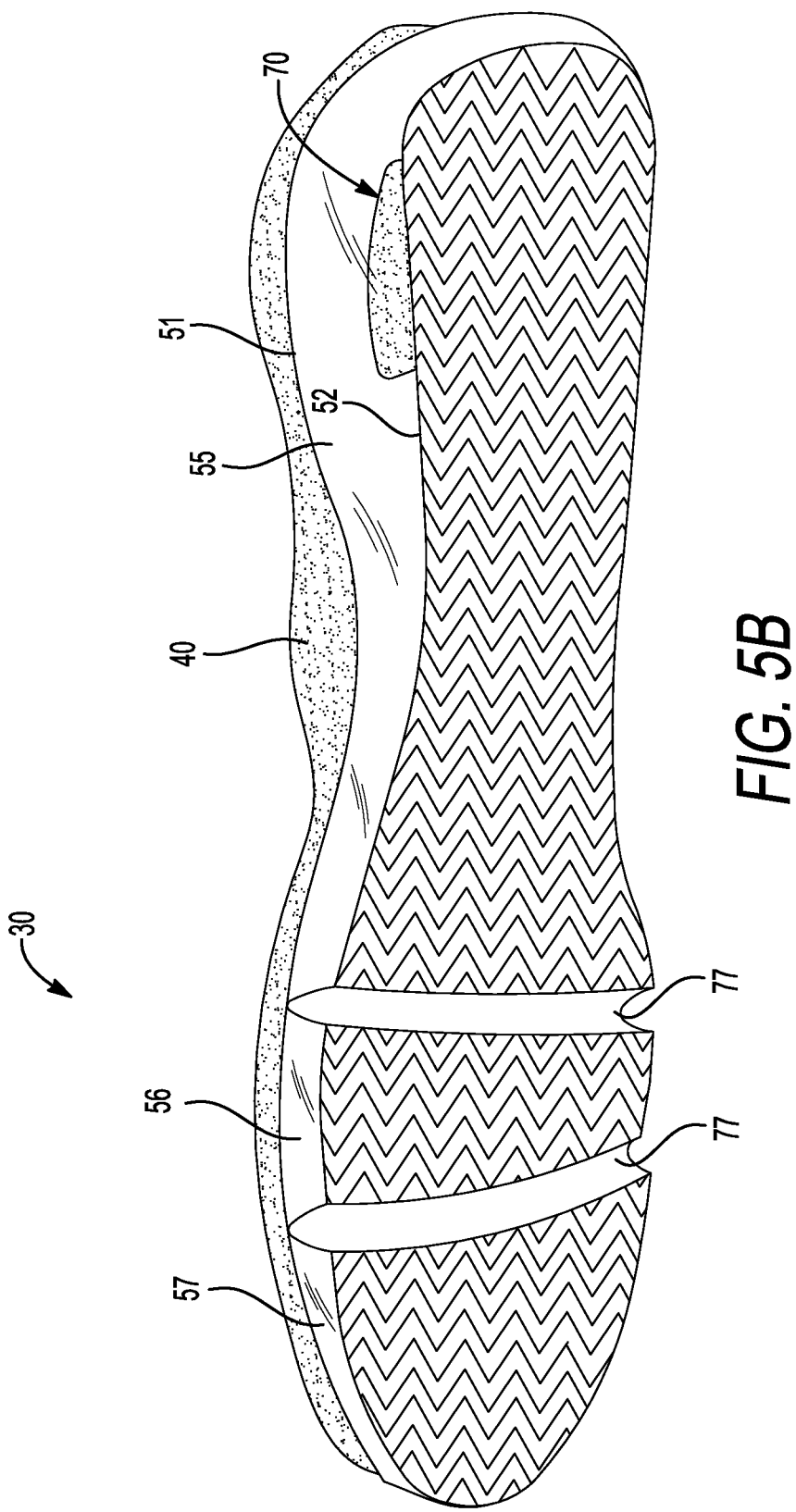

FOOTWEAR FLUID-FILLED CHAMBER HAVING CENTRAL TENSILE FEATURE

BACKGROUND

A conventional article of athletic footwear includes two primary elements, an upper and a sole structure. The upper may be formed from a plurality of material elements (e.g., textiles, leather, and foam materials) that define a void to securely receive and position a foot with respect to the sole structure. The sole structure is secured to a lower surface of the upper and is generally positioned to extend between the foot and the ground. In addition to attenuating ground reaction forces, the sole structure may provide traction, impart stability, and limit various foot motions, such as pronation. Accordingly, the upper and the sole structure operate cooperatively to provide a comfortable structure that is suited for a wide variety of ambulatory activities, such as walking and running.

The sole structure of an article of athletic footwear generally exhibits a layered configuration that includes a comfort-enhancing insole, a resilient midsole at least partially formed from a polymer foam material, and a ground-contacting outsole that provides both abrasion-resistance and traction. Suitable polymer foam materials for the midsole include ethylvinylacetate or polyurethane that compresses resiliently under an applied load to attenuate ground reaction forces. Conventional polymer foam materials compress resiliently, in part, due to the inclusion of a plurality of open or closed cells that define an inner volume substantially displaced by gas. Following repeated compressions, the cells of the polymer foam may deteriorate, thereby resulting in decreased compressibility and decreased force attenuation characteristics of the sole structure.

One manner of reducing the mass of a polymer foam midsole and decreasing the effects of deterioration following repeated compressions is to incorporate a fluid-filled chamber into the midsole. In general, the fluid-filled chambers are formed from a sealed elastomeric polymer material that may be pressurized. The chambers are then encapsulated in the polymer foam of the midsole such that the combination of the chamber and the encapsulating polymer foam functions as the midsole. In some configurations, textile or foam tensile members may be located within the chamber or reinforcing structures may be bonded to an exterior surface of the chamber to impart shape to or retain an intended shape of the chamber.

Fluid-filled chambers suitable for footwear applications may be manufactured by a two-film technique, in which two separate sheets of elastomeric film are formed to exhibit the overall peripheral shape of the chamber. The sheets are then bonded together along their respective peripheries to form a sealed structure, and the sheets are also bonded together at predetermined interior areas to give the chamber a desired configuration. That is, interior bonds (i.e., bonds spaced inward from the periphery) provide the chamber with a predetermined shape and size upon pressurization. In order to pressurize the chamber, a nozzle or needle connected to a fluid pressure source is inserted into a fill inlet formed in the chamber. Following pressurization of the chamber, the fill inlet is sealed and the nozzle is removed. A similar procedure, referred to as thermoforming, may also be utilized, in which a heated mold forms or otherwise shapes the sheets of elastomeric film during the manufacturing process.

Chambers may also be manufactured by a blow-molding technique, wherein a molten or otherwise softened elastomeric material in the shape of a tube is placed in a mold having the desired overall shape and configuration of the chamber. The mold has an opening at one location through which pressurized air is provided. The pressurized air induces the liquefied elastomeric material to conform to the shape of the inner surfaces of the mold. The elastomeric material then cools, thereby forming a chamber with the desired shape and configuration. As with the two-film technique, a nozzle or needle connected to a fluid pressure source is inserted into a fill inlet formed in the chamber in order to pressurize the chamber. Following pressurization of the chamber, the fill inlet is sealed and the nozzle is removed.

SUMMARY

An article of footwear may have an upper and a sole structure secured to the upper. The sole structure may include a chamber defining an interior void for receiving a pressurized fluid, the chamber having a top portion, a bottom portion, and side portions extending between the top portion and the bottom portion around a periphery of the chamber. The sole structure may also include a central structure located in a central portion of the chamber between opposing side portions of the chamber, such that the chamber is devoid of additional structures in a surrounding region around the central structure and extending from the central structure to the side portions of the chamber. In addition, on all sides of the central structure, a dimension of the surrounding region between the central structure and the nearest side portion is one third or more of a span across the chamber between opposing side portions.

An article of footwear may have an upper and a sole structure secured to the upper. The sole structure may include a chamber defining an interior void for receiving a pressurized fluid, the chamber being formed of a substantially transparent material and having a top portion, a bottom portion, and side portions extending between the top portion and the bottom portion around a periphery of the chamber. The sole structure may also include a central structure located in a central portion of the chamber in both a lateral direction and a longitudinal direction, and occupying one third or less of a distance between opposing side portions of the chamber in the lateral direction and in the longitudinal direction.

An article of footwear may have an upper and a sole structure secured to the upper. The sole structure may include a chamber defining an interior void for receiving a pressurized fluid, the chamber having a top portion, a bottom portion, and side portions extending between the top portion and the bottom portion around a periphery of the chamber. In addition, the sole structure may also include a central structure including a tensile member extending between and connecting the top portion of the chamber to the bottom portion of the chamber. The central structure may be located in a central portion of the chamber in both a lateral direction and a longitudinal direction, and may occupy one third or less of a distance between opposing sides of the chamber in the lateral direction and in the longitudinal direction. In addition, the central structure may be attached to the top portion of the chamber in a contact area, and the top portion of the chamber including the contact area extending further downward than other portions of the top portion of the chamber, forming a recess in the top portion of the chamber. Further, the sole structure may include a reinforcing member including an upper portion having a lower surface bonded to the top portion of the chamber and a support structure extending downward from the lower surface into the recess in the top portion of the chamber.

An article of footwear may have an upper and a sole structure secured to the upper. The sole structure may include a chamber defining an interior void for receiving a pressurized fluid, the chamber having a top portion, a bottom portion, and side portions extending between the top portion and the bottom portion around a periphery of the chamber. The sole structure may also include a central structure located in a central portion of the chamber between opposing side portions of the chamber, such that the chamber is devoid of additional structures in a surrounding region around the central structure and extending from the central structure to the side portions of the chamber. Further, the sole structure may include a foam pillar extending downward into, and substantially filling the recess in the top portion of the chamber.

A method of making a sole structure for an article of footwear may include inserting a preformed reinforcing member in a first half of a mold, inserting a preformed outsole in a second half of the mold, and closing the first half and the second half of the mold against a bladder material. In addition, the method may include applying heat and pressure to thereby simultaneously form the bladder material into a chamber defining an interior void for receiving a pressurized fluid and join the chamber to the reinforcing member and the outsole. At least one of the reinforcing member and the bladder material include a central structure. Applying heat and pressure may include joining a top portion of the chamber to a bottom portion of the chamber with the central structure. Further, joining the top portion of the chamber to the bottom portion of the chamber with the central structure includes locating the central structure in a central portion of the chamber between opposing side portions of the chamber, in both a lateral direction and a longitudinal direction, such that the chamber is devoid of additional structures in a surrounding region around the central structure and extending from the central structure to the side portions of the chamber, such that the central structure occupies one third or less of a distance between opposing side portions of the chamber in the lateral direction and in the longitudinal direction.

The advantages and features of novelty characterizing aspects of the invention are pointed out with particularity in the appended claims. To gain an improved understanding of the advantages and features of novelty, however, reference may be made to the following descriptive matter and accompanying drawings that describe and illustrate various embodiments and concepts related to the invention.

FIGURE DESCRIPTIONS

The foregoing Summary and the following Detailed Description will be better understood when read in conjunction with the accompanying drawings.

FIG. 5B is a bottom perspective view of the full length sole structure shown in FIG. 5A.

DETAILED DESCRIPTION

Figure 1:
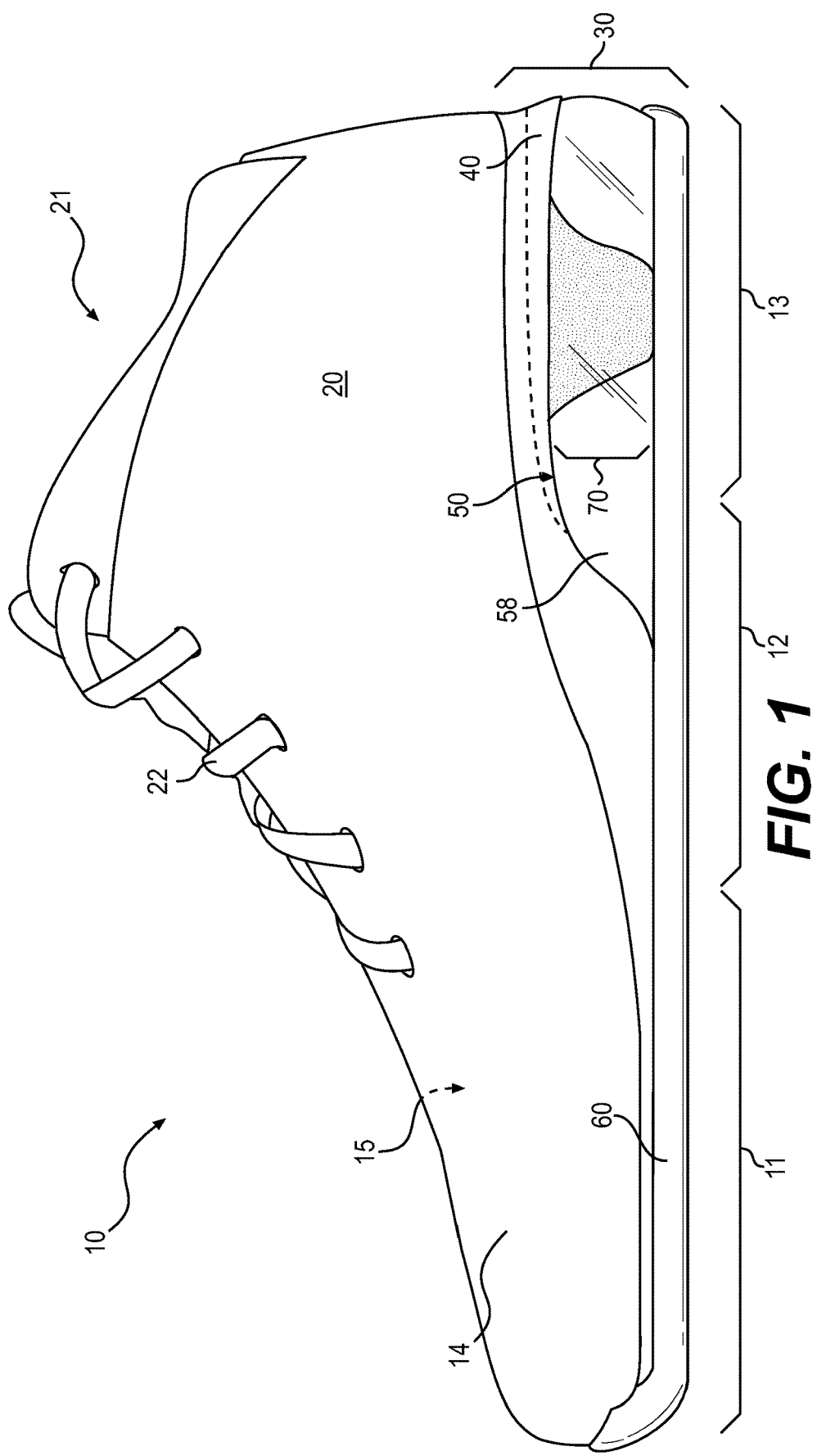
FIG. 1 is a side elevational view of an article of footwear having a sole structure including a chamber.

The following discussion and accompanying figures disclose various configurations of footwear sole structures that include chambers and other elements. The sole structures are disclosed with reference to footwear having a configuration that is suitable for any ambulatory activity. The disclosed sole structure configurations are shown in the accompanying figures as implemented in a basketball shoe and a running or general training shoe. Concepts associated with the disclosed sole structures are not limited to footwear designed for basketball, running, or general athletic training shoes, however, and may be utilized with a wide range of athletic footwear styles, including tennis shoes, football shoes, cross-training shoes, walking shoes, and soccer shoes, for example. The concepts associated with the sole structures may also be utilized with footwear styles that are generally considered to be non-athletic, including dress shoes, loafers, sandals, and boots. Accordingly, the concepts disclosed herein apply to a wide variety of footwear styles.

For consistency and convenience, directional adjectives are employed throughout this detailed description corresponding to the illustrated configurations. The term "longitudinal," as used throughout this detailed description and in the claims, refers to a direction extending a length of a sole structure, i.e., extending from a forefoot portion to a heel portion of the sole. The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending a width of a sole. In other words, the lateral direction may extend between a medial side and a lateral side of an article of footwear, with the lateral side of the article of footwear being the surface that faces away from the other foot, and the medial side being the surface that faces toward the other foot.

The term "horizontal," as used throughout this detailed description and in the claims, refers to any direction substantially parallel with the ground, including the longitudinal direction, the lateral direction, and all directions in between. Similarly, the term "side," as used in this specification and in the claims, refers to any portion of a component facing generally in a lateral, medial, forward, and/or rearward direction, as opposed to an upward or downward direction.

The term "vertical," as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to an article of footwear as a whole or to individual components of the footwear. The term "upward" refers to the vertical direction heading away from a ground surface, while the term "downward" refers to the vertical direction heading towards the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, and/or other joining techniques. In addition, two components may be "fixedly attached" by virtue of being integrally formed, for example, in a molding process.

General Footwear Structure

An article of footwear 10 is depicted in FIG. 1 as including an upper 20 and a sole structure 30. For reference purposes, footwear 10 may be divided into three general regions: a forefoot region 11, a midfoot region 12, and a heel region 13, as shown in FIG. 1. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration. Further, upper 20 may incorporate any of a plurality of suitable material elements (e.g., textiles, foam, leather, synthetic leather, and other materials) that may be stitched or adhesively bonded together to form an interior void for securely and comfortably receiving a foot. The material elements may be selected and located with respect to upper 20 in order to selectively impart properties of durability, air-permeability, wear-resistance, flexibility, and comfort, for example. The upper and/or other footwear components disclosed herein may be formed of any suitable materials. In some configurations, the disclosed footwear 10 may employ one or more materials disclosed in Lyden et al. (U.S. Pat. No. 5,709,954), which is hereby incorporated by reference in its entirety.

An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Given that various aspects of the present application primarily relate to sole structure 30, upper 20 may exhibit the general configuration discussed above or the general configuration of practically any other conventional or non-conventional upper. Accordingly, the overall structure of upper 20 may vary significantly.

Sole structure 30 is secured to upper 20 and has a configuration that extends between upper 20 and the ground. In addition to attenuating ground reaction forces (i.e., providing cushioning for the foot), sole structure 30 may provide traction, impart stability, and limit various foot motions, such as pronation. In addition to the various elements discussed in detail below, sole structure 30 may incorporate one or more support members, moderators, or reinforcing structures, for example, that further enhance the ground reaction force attenuation characteristics of sole structure 30 or other performance properties of footwear 10. Sole structure 30 may also incorporate an insole or sockliner that is located within the void in upper 20 and adjacent a plantar (i.e., lower) surface of the foot to enhance the comfort of footwear 10.

First Sole Structure Configuration

Sole structure 30 may include a plurality of components, such as a reinforcing member 40, a chamber 50 defining a void 58 configured to received a pressurized fluid, and an outsole 60, as depicted in FIGS. 1-4. In some embodiments, reinforcing member 40 may form an upper portion of sole structure 30 and may be positioned adjacent, and fixedly attached to upper 20 and chamber 50. Chamber 50 forms a middle portion of sole structure 30 and is positioned between, and fixedly attached to reinforcing member 40 and outsole 60. In addition, outsole 60 forms a lower portion of sole structure 30 and is positioned to engage the ground.

In some configurations, reinforcing member 40, chamber 50, and/or outsole 60 may extend around a perimeter of sole structure 30. Thus, in some configurations, one or more of these components may have a shape that generally corresponds with an outline of the foot. As will be discussed in greater detail below, reinforcing member 40, chamber 50, and/or outsole 60 may extend from forefoot region 11 to heel region 13 and also from lateral side 14 to medial side 15. In other configurations, however, reinforcing member 40, chamber 50, and/or outsole 60 may extend only in a region that corresponds with a smaller region of the foot, such as the heel, midfoot, and/or forefoot. For example, the configuration of these components shown in FIGS. 1-4 is configured for use in heel region 13 of footwear 10. (See FIG. 1.)

In some configurations, reinforcing member 40 and/or chamber 50 may be exposed to an exterior of footwear 10 and may cooperatively form at least a portion of a side surface of sole structure 30. For example, one or more portions of chamber 50 may be exposed. In some configurations, at least medial and lateral portions of chamber 50 may be exposed. Further, in some configurations, in addition to medial and lateral portions of chamber 50 being exposed, a posterior (rearward) portion of chamber 50 may also be exposed, as shown in FIG. 1. In some configurations, the material from which chamber 50 is made may be transparent such that structural features in a central region of chamber 50 may be viewable through exposed side portions of chamber 50.

In some configurations, upper 20 may extend over the sides of reinforcing member 40, with edges of reinforcing member 40 spaced inward from the side surface of sole structure 30. Similarly, portions of reinforcing member 40 and/or outsole 60 may cover the sides (or portions of the sides) of chamber 50. For example, as shown in FIG. 1, reinforcing member 40 may be covered by another portion of upper 20 and/or other portions of sole structure 30. Thus, an upper surface 41 of reinforcing member 40 is indicated in FIG. 1 by a dashed line.

Figure 2:
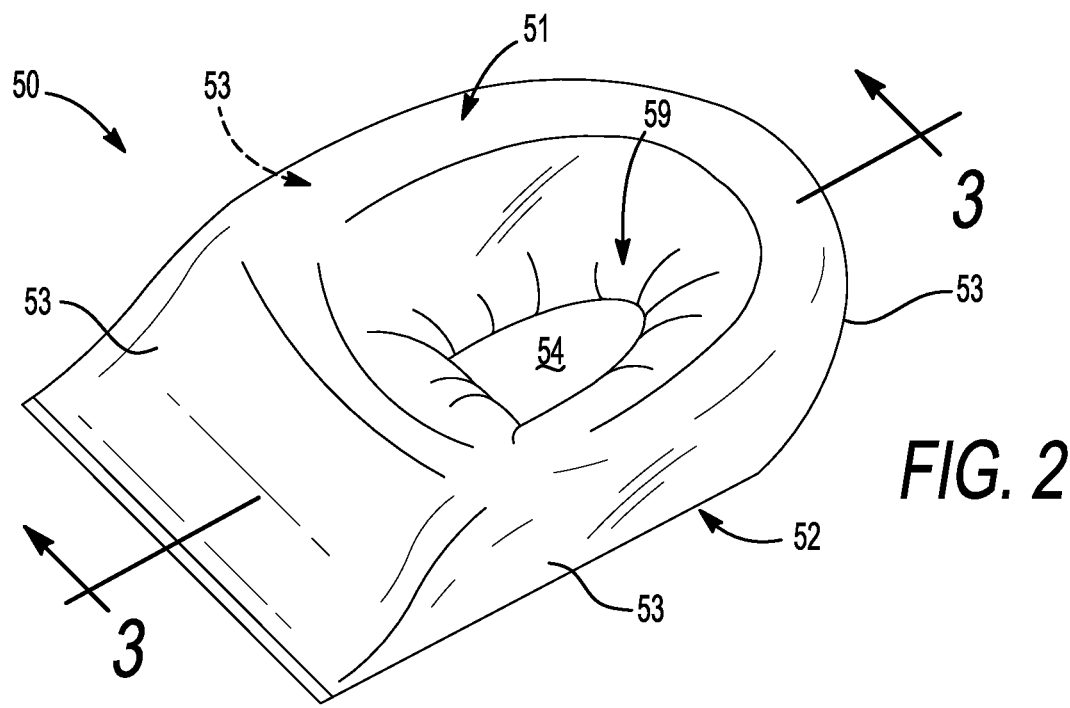
FIG. 2 is a perspective view of a chamber component of the sole structure of the article of footwear in FIG. 1.
Figure 3:
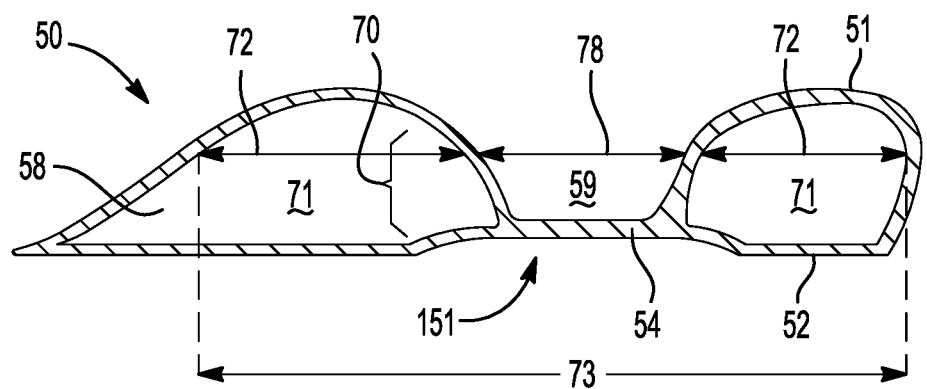
FIG. 3 is a cross-sectional view of the chamber shown in FIG. 2 taken at line 3-3 in FIG. 2.

Chamber 50 is depicted individually in FIGS. 2 and 3. FIG. 2 is a perspective view of chamber 50 and FIG. 3 is a cross-sectional view taken at line 3-3 in FIG. 2. Chamber 50 may be formed of a bladder material defining an interior void 58 for receiving a pressurized fluid. Chamber 50 may have a top portion 51, a bottom portion 52, and side portions 53 extending between top portion 51 and bottom portion 52 around a periphery of chamber 50. As also discussed above, chamber 50 may have a shape that generally corresponds with one or more portions of the sole of a foot. The configuration of chamber 50 shown in FIGS. 2 and 3 is generally configured for incorporation into a heel region of an article of footwear. (See FIG. 1.)

In addition to having a shape that generally corresponds with an outline of the foot, chamber 50 may have a size and shape that is particularly suitable for one or more footwear applications. For example, taller (thicker) chambers 50 may be suitable for use in running shoes where cushioning is a primary desirable performance attribute, whereas shorter chambers 50 may be suitable for use in basketball shoes, where a low profile is desirable in order to provide lateral stability and responsiveness. Further, chamber 50 may be tapered. For example, as shown in FIGS. 2 and 3, chamber 50 may be tapered toward an anterior (forward) end, in order to provide a transition to other cushioning structures used in other portions of the foot, such as the midfoot and forefoot regions, which may use a different cushioning system, such as a foam layer (without an associated fluid-filled chamber).

Chamber 50 may be formed from a polymer or other bladder material that provides a sealed barrier for enclosing a fluid. As noted above, the bladder material may be transparent. A wide range of polymer materials may be utilized for chamber 50. In selecting materials for chamber 50, engineering properties of the material (e.g., tensile strength, stretch properties, fatigue characteristics, dynamic modulus, and loss tangent) as well as the ability of the material to prevent the diffusion of the fluid contained by chamber 50 may be considered. When formed of thermoplastic urethane, for example, the outer barrier of chamber 50 may have a thickness of approximately 1.0 millimeter, but the thickness may range from 0.25 to 2.0 millimeters or more, for example.

In addition to thermoplastic urethane, examples of polymer materials that may be suitable for chamber 50 include polyurethane, polyester, polyester polyurethane, and polyether polyurethane. Chamber 50 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for chamber 50 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al. The patents listed in this paragraph are incorporated herein by reference in their entirety.

The fluid within chamber 50 may range in pressure from zero to three-hundred-fifty kilopascals (i.e., approximately fifty-one pounds per square inch) or more. In some configurations of sole structure 30, a suitable pressure for the fluid may be a substantially ambient pressure. That is, the pressure of the fluid may be within five kilopascals of the ambient pressure of the atmospheric air surrounding footwear 10. The pressure of fluid within chamber 50 may be selected to provide desirable performance attributes. For example, higher pressures may provide a more responsive cushioning element, whereas lower pressures may provide more ground force attenuation (a softer cushion). The pressure of fluid within chamber 50 may be selected to work in concert with other cushioning elements of footwear 10, such as foam members and/or an insole (not shown).

In some configurations, chamber 50 may be inflated with substantially pure nitrogen. Such an inflation gas promotes maintenance of the pressure within chamber 50 through diffusion pumping, whereby the deficiency of other gases (besides nitrogen), such as oxygen, within chamber 50 biases the system for inward diffusion of such gasses into chamber 50. Further, bladder materials, such as those discussed above, may be substantially impermeable to nitrogen, thus preventing the escape of the nitrogen from chamber 50.

In some configurations, relatively small amounts of other gases, such as oxygen or a mixture of gasses, such as air, may be added to the nitrogen occupying most of the volume within chamber 50. In addition to air and nitrogen, the fluid contained by chamber 50 may include octafluoropropane or be any of the gasses disclosed in U.S. Pat. No. 4,340,626 to Rudy, such as hexafluoroethane and sulfur hexafluoride, for example. In some configurations, chamber 50 may incorporate a valve that permits the individual to adjust the pressure of the fluid. In other configurations, chamber 50 may be incorporated into a fluid system, as disclosed in U.S. Pat. No. 7,210,249 to Passke, et al., as a pump chamber or a pressure chamber. In order to pressurize chamber 50 or portions of chamber 50, the general inflation methods disclosed in Hensley et al., U.S. Pat. No. 8,241,450, issued Aug. 14, 2012, and entitled "Method For Inflating A Fluid-Filled Chamber," and Schindler et al., U.S. Pat. No. 8,863,408, issued Oct. 21, 2014, and entitled "Article Of Footwear Having A Sole Structure With A Fluid-Filled Chamber," (now U.S. Patent Application Publication No. US 2009/0151196, published Jun. 18, 2009), may be utilized. The patents and published patent applications listed in this paragraph are incorporated herein by reference in their entirety.

Upon inflation, chambers experience pressure that is evenly distributed to all portions of the inner surface of the bladder material from which the chamber is formed. Accordingly, the tendency is for chambers, when inflated, to take on an outwardly rounded shape. For use as cushioning members in footwear, however, it is desirable to provide the chambers with a relatively flat form, to serve as a platform for receiving the sole of a foot of a wearer. Thus, to limit the expansion of the top and bottom portions of the chamber upon inflation, one or more central structures may link the top portion of the chamber to the bottom portion of the chamber. Exemplary central structures are discussed in greater detail below.

Figure 4:
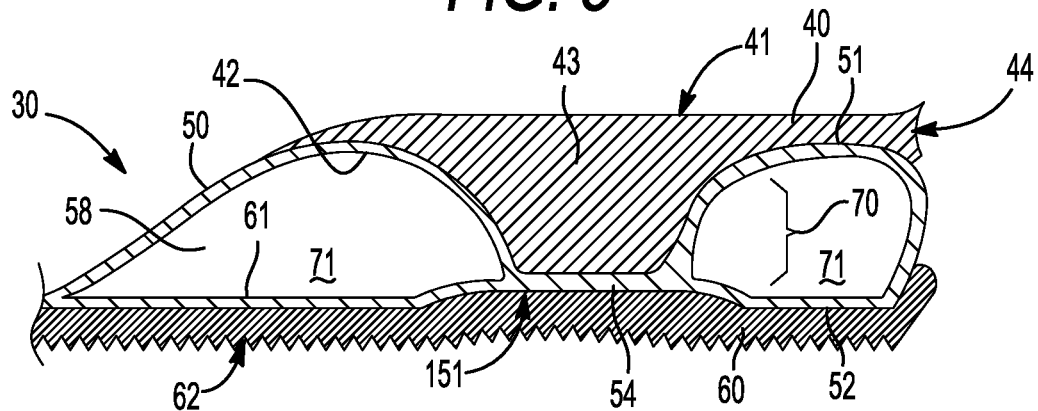
FIG. 4 is a cross-sectional view of the chamber shown in FIG. 3, and further showing additional sole structure components.

As shown in FIGS. 2-4, a recess 59 may be part of a central structure 70 of sole structure 30. As shown in FIGS. 2 and 3, a section of chamber 50 may include a bonded area 54 where top portion 51 is bonded, or otherwise joined, to bottom portion 52. Bonded area 54 may form recess 59 in top portion 51 of chamber 50.

Central structure 70 may located in a central portion of chamber 50 between opposing side portions 53 of chamber 50, such that chamber 50 is devoid of additional structures in a surrounding region 71 around central structure 70 and extending from central structure 70 to side portions 53 of chamber 50.

Central structure 70 (and other central structures disclosed herein) may be substantially centrally located within chamber 50. For example, central structure 70 may be situated in chamber 50 such that, on all sides of central structure 70, a dimension 72 of surrounding region 71 between central structure 70 and the nearest side portion 53 is one third or more of a span 73 across chamber 50 between opposing side portions 53. In some configurations, central structure 70 may be located in a central portion of chamber 50 in both a lateral direction and a longitudinal direction, and may occupy a dimension 78 that is one third or less of a distance (span 73) between opposing side portions of chamber 50 in the lateral direction and in the longitudinal direction. In some configurations, central structure 70 maybe located in a central portion of chamber 50 in both a lateral direction and a longitudinal direction, and may occupy approximately one third or less of chamber 50. The foregoing size and location parameters for central structures may be applied, in some cases to volumetric measurements, surface area measurements, and/or length measurements. In some cases, the foregoing parameters may be taken at a largest or smallest portion of a connecting portion, or at any portion in between. For example, a tapered central structure may be evaluated for the parameters discussed above, such as spacing from side portions of the chamber, at the narrowest portion of the tapered central structure.

Reinforcing member 40 may have an upper portion 44, which includes a lower surface 42 bonded to top portion 51 of chamber 50 and a support structure 43 extending from lower surface 42 into recess 59 in top portion 51 of chamber 50. Support structure 43 may provide vertical support within sole structure 30. Support structure 43 may have any suitable shape. For example, in some configurations, support structure 43 may have a substantially frustoconical shape, as shown in FIG. 4 (see also FIG. 1). In some embodiments, support structure 43 may have a pillar-like configuration or a column-like configuration. It will be noted that pillar-like or column-like configurations of support structure 43 may have any suitable shape. In some configurations such support structures may be substantially cylindrical. That is, such support structures may have a substantially circular horizontal cross-sectional shape, and a substantially consistent cross-sectional area from an upper portion of the support structure to a lower portion of the support structure. In other configurations, such support structures may have other, non-circular, horizontal cross-sectional shapes, including oval shapes, polygonal shapes, and irregular shapes. In addition, the cross-sectional area of such support structures may vary from an upper portion of the support structure to the lower portion of the support structure.

Bonding of reinforcing member 40 to top portion 51 of chamber 50 may prevent bulging of chamber 50 and, in addition, may also correct for curvature of bladder, to provide a suitable surface to receive a foot. For example, lower surface 42 of upper portion 44 of reinforcing member 40 may be concave to receive convex curvatures of top portion 51 of chamber 50. Whereas, top surface 41 of reinforcing member 40 may be relatively flat to serve as a platform for the foot. However, to improve fit, comfort, and stability, one or more portions of top surface 41 of reinforcing member 40 may have a pre-formed anatomical shape according to the portion of the foot to which it corresponds. Accordingly, some portions, such as a heel portion of top surface 41 may have a concave shape to correspond with the contours of the heel of a wearer. Other portions of upper surface 41 of reinforcing member 40, such as an arch portion, may have a convex shape.

Reinforcing member 40 may be formed of any suitable material. In some embodiments, reinforcing member 40 may be formed of a plate. Such a plate may be substantially incompressible. In addition, in some embodiments, such a plate may have a rigid or semi-rigid configuration. A suitable plate may be formed of any suitable material, including rigid or semi-rigid plastics, such as polyurethane and/or vinyl, carbon fiber or other composite materials, or any other suitable material. The rigidity of such a preformed plate may prevent the bulging of chamber 50, as discussed above. In addition, such a plate may provide strength and support to sole structure 30, as well as lateral and torsional stability.

In some embodiments reinforcing member 40 may be formed, at least in part, of a foam material. Such a foam reinforcing member may be manufactured from a diverse range of materials that include polymers, polymer foams, and other suitable materials, for example. Suitable polymers include polyester, polyurethane, ethylvinylacetate (EVA), thermoset urethane, thermoplastic urethane, various nylon formulations, rubber, polyether block amide, polybutylene terephthalate, or blends of these materials. For example, in some configurations, reinforcing member 40 may be formed of a polyurethane foam or an ethylvinylacetate (EVA) foam.

Additional materials from which reinforcing member 40 may be formed include composite materials, which may include glass fibers and/or carbon fibers incorporated into the various polymer materials discussed above.

Further, in some embodiments, a rigid or semi-rigid plate may be combined with a foam material to form reinforcing member 40. For example, in some embodiments, upper portion 44 of reinforcing member 40 may be formed of a rigid or semi-rigid plate and support structure 43 may be formed of a compressible material, such as a compressible foam.

In some embodiments, reinforcing member 40 may be formed by selective laser sintering (SLS) small particles of suitable materials. Accordingly, a variety of different materials may be utilized in manufacturing reinforcing member 40, depending upon the desired properties for sole structure 30.

Outsole 60, which is depicted in FIG. 4, forms the ground-contacting portion of footwear 10. Outsole 60 has an upper surface 61 and an opposite lower surface 62. Upper surface 61 may be fixedly attached to bottom portion 52 of chamber 50 by any suitable arrangement, such as adhesive, welding, stitching, and/or any other suitable means. Although a variety of materials may be utilized for outsole 60, rubber materials may be utilized to impart durability and wear-resistance. In addition, lower surface 62 may also be textured to provide the traction (i.e., friction) properties between footwear 10 and the ground.

As further shown in FIG. 4, in some configurations, bonded area 54 may form an indentation 151 in bottom portion 52 of chamber 50. Whereas recess 59 in top portion 51 of chamber 50 may receive support structure 43, which is a downwardly extending portion of reinforcing member 40, indentation 151 in bottom portion 52 of chamber 50 may receive an opposing piece of foam material or, as shown in FIG. 4, outsole 60 may be simply adhered to the indented chamber material directly. In some configurations, this may result in lower surface 62 of outsole 60 being also indented. In other configurations, outsole 60 may be made thicker in the region corresponding with indentation 151, in order to provide outsole 60 with a relatively flat lower surface 62.

It will be noted that, although FIGS. 2-3 illustrate an embodiment where support structure 43 is disposed outside of chamber 50, in some embodiments, support structure 43 may be disposed inside chamber 50. For example, in some embodiments, an upper portion of support structure 43 may connect to top portion 51 of chamber 50, and a lower portion of support structure 43 may connect to bottom portion 52 of chamber 50. Similar embodiments described below may also be configured similarly, with support structure inside chamber 50.

Figure 5A:
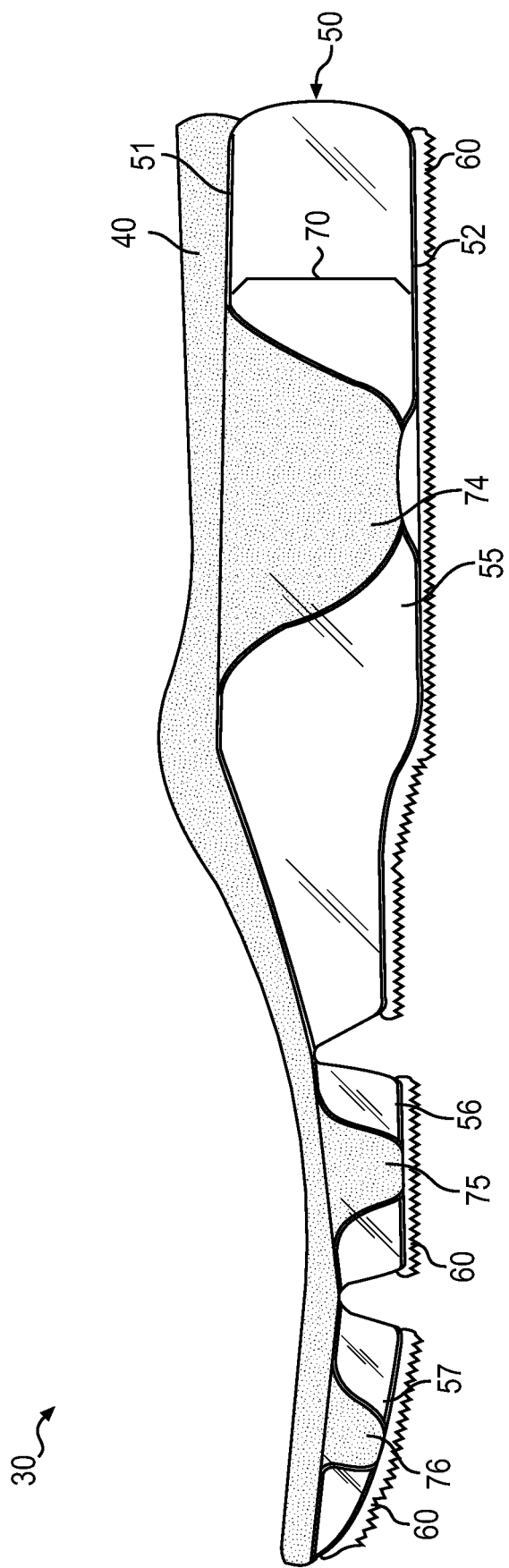
FIG. 5A is a side elevational view of a full length sole structure including multiple chambers.

Chamber 40 and reinforcing member 50 may extend over a portion or substantially all of the footbed of sole structure 30. For example, FIG. 5A illustrates a full length sole structure 30. In some configurations, chamber 50 may include a single void that extends the full length of footwear 10. In other configurations, chamber 50 may include multiple voids or subchambers. For example, as shown in FIG. 5A, chamber 50 may include a heel subchamber 55, a first forefoot subchamber 56, and a second forefoot subchamber 57. In some configurations, subchambers 55, 56, and 57 may be in fluid communication with one another. In other configurations, subchambers 55, 56, and 57 may form three independent voids, as shown in FIG. 5A. This configuration may permit subchambers 55, 56, and 57 to be inflated to different pressures. Thus, portions of chamber 50 may be segregated to form different zones of pressure, to provide desired performance characteristics.

As shown in FIG. 5A, each subchamber may include a separate central structure. For example, sole structure 30 may include a first central structure 74, a second central structure 75, and a third central structure 76. Each of central structures 74, 75, and 76 may have any of the configurations discussed in this disclosure. One or more of central structures 74, 75, and 76 may have a substantially centralized location, as discussed above.

As also shown in FIG. 5A, chamber 50 may exhibit a tapered configuration between heel region 13 and forefoot region 11. That is, the portion of chamber 50 in heel region 13 exhibits a greater overall thickness than the portion of chamber 50 in forefoot region 11. The tapering provides chamber 50 with a configuration wherein the portion of top portion 51 in heel region 13 is generally at a greater elevation than the portion of top portion 51 in forefoot region 11. The tapering of chamber 50 and the resulting differences in elevations impart an overall contour to chamber 50 that complements the general anatomical structure of the foot. That is, these contours ensure that the heel of the foot is slightly raised in relation to the forefoot. Although not depicted in the figures, some configurations of chamber 50 may include a depression in heel region 13 for receiving the heel, and chamber 50 may have a protrusion in midfoot region 12 that supports the arch of the foot.

FIG. 5B illustrates a bottom perspective view of full length sole structure 30 shown in FIG. 5A. As shown in FIG. 5B, providing sole structure 30 with separate subchambers may form grooves 77, which may facilitate anatomical bending of sole structure 30 at a region corresponding with the ball of the foot.

A variety of techniques may be utilized to manufacture sole structure 30. As an example, chamber 50 may be formed from a pair of polymer sheets that are molded and bonded during a thermoforming process. More particularly, the thermoforming process (a) imparts shape to one of the polymer sheets in order to form top portion 51, (b) imparts shape to the other of the polymer sheets in order to form bottom portion 52, (c) forms side portions 53 from one or both of the sheets, and (d) forms bonded areas 54 to join interior portions of top portion 51 and bottom portion 52 of chamber 50. Once chamber 50 is formed, each of reinforcing member 40 and outsole 60 are secured to opposite sides of chamber 50, through adhesive bonding or heat bonding, for example. Chamber 50 may also be formed from a blow-molding process wherein a parison or molten or uncured polymer material extends between mold portions having a shape of chamber 50. The polymer material is then drawn into the mold to impart the shape of chamber 50. Upon cooling or curing, chamber 50 is removed from the mold and each of reinforcing member 40 and outsole 60 are secured to opposite sides of chamber 50. Sole structure 30 may be formed in any suitable way, including by methods disclosed in Hensley et al., U.S. Pat. No. 8,241,450, issued Aug. 14, 2012, and entitled "Method For Inflating A Fluid-Filled Chamber," and U.S. Pat. No. 8,863,408, issued Oct. 21, 2014, and entitled "Article Of Footwear Having A Sole Structure With A Fluid-Filled Chamber," (now U.S. Patent Application Publication No. US 2009/0151196, published Jun. 18, 2009), which discuss the aforementioned thermoforming and blowmolding processes.

Figure 6A:
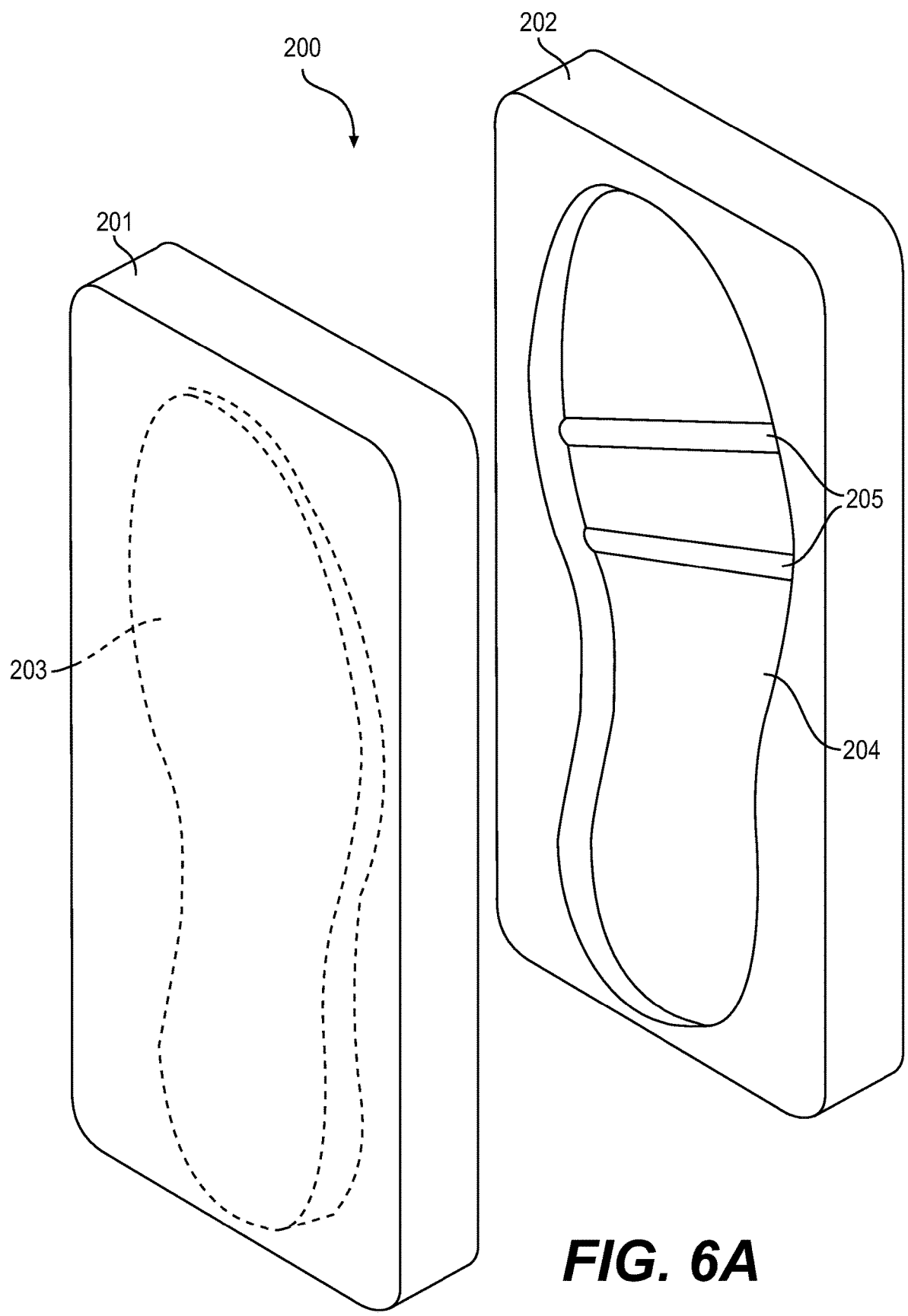
FIG. 6A illustrates two halves of a mold for assembling the sole structure shown in FIGS. 5A and 5B.
Figure 6B:
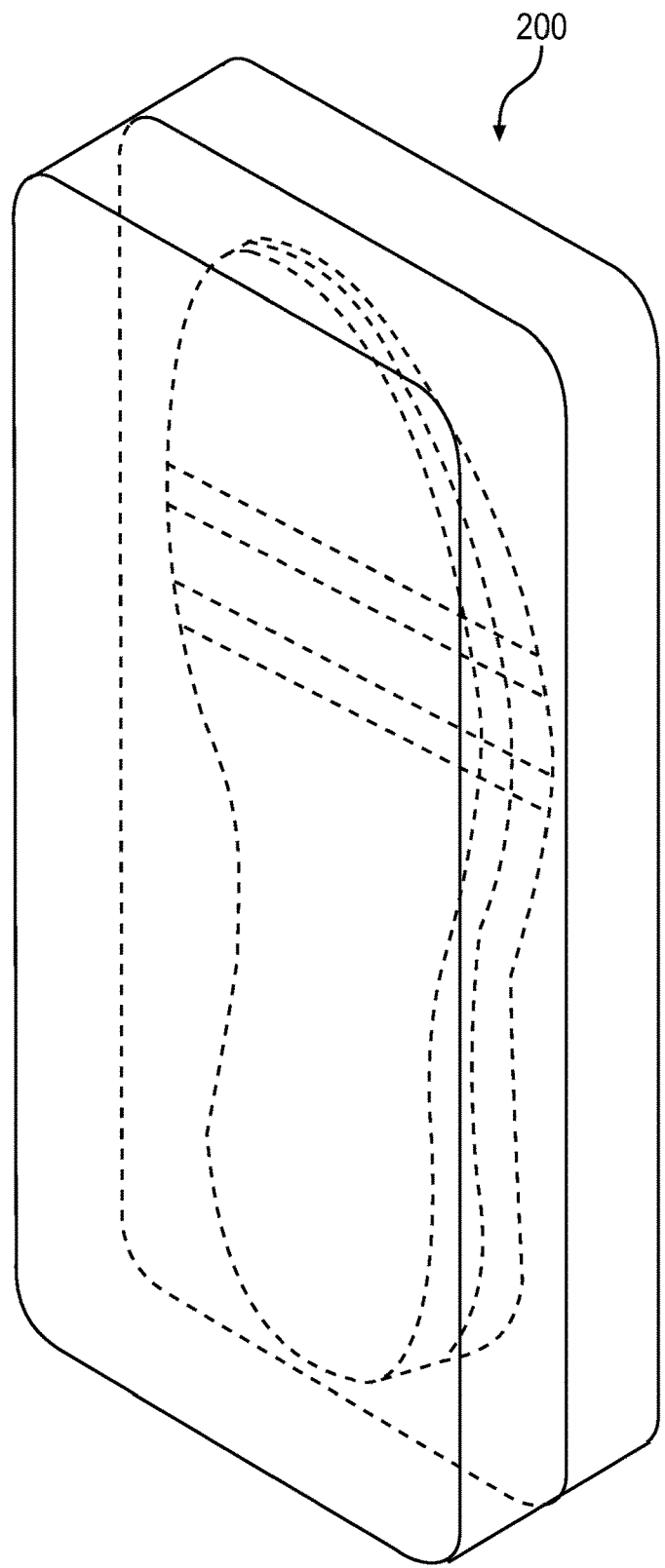
FIG. 6B illustrates the two halves of the mold shown in FIG. 6A placed together.

Also, in some cases, the molding of chamber 50 may be performed simultaneously with the joining of chamber 50 to outsole 60 and reinforcing member 40, as described in U.S. Pat. No. 8,863,408, issued Oct. 21, 2014, and entitled "Article Of Footwear Having A Sole Structure With A Fluid-Filled Chamber," (now U.S. Patent Application Publication No. US 2009/0151196, published Jun. 18, 2009). FIG. 6A illustrates a mold 200 for assembling sole structure 30 shown in FIGS. 5A and 5B. As shown in FIG. 6A, mold 200 may include a top half 201 and a bottom half 202. Top half 201 may include a first recess 203, and bottom half 202 may include a second recess 204. FIG. 6B illustrates top half 201 and bottom half 202 of mold 200 placed together.

Figure 6C:
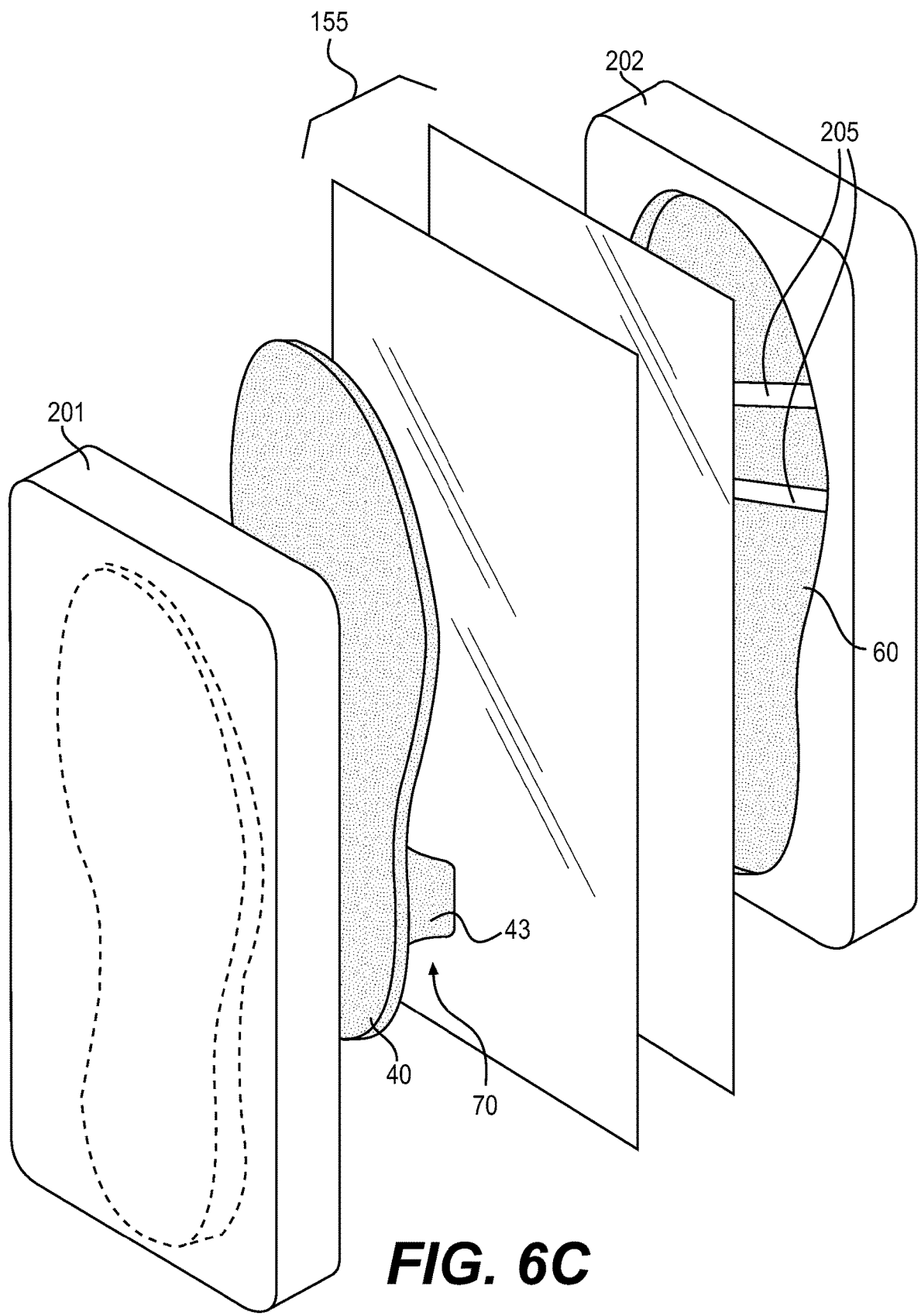
FIG. 6C illustrates the components of the sole structure of FIGS. 5A and 5B being inserted into the mold of FIG. 6A.

FIG. 6C illustrates the components of sole structure 300 being inserted into mold 200. As shown in FIG. 6C, bottom half 202 of mold 200 may include ridges 205 for forming grooves 77 in sole structure 300. (See also FIG. 6A.) As shown in FIG. 6C, outsole 60 (or pieces thereof as the case is here), in a premolded form, may be inserted into bottom half 202 of mold 200. Similarly, reinforcing member 40, also in a premolded form (e.g., including foam support structure 43) may be inserted into top half 201 of mold 200.

Figure 6D:
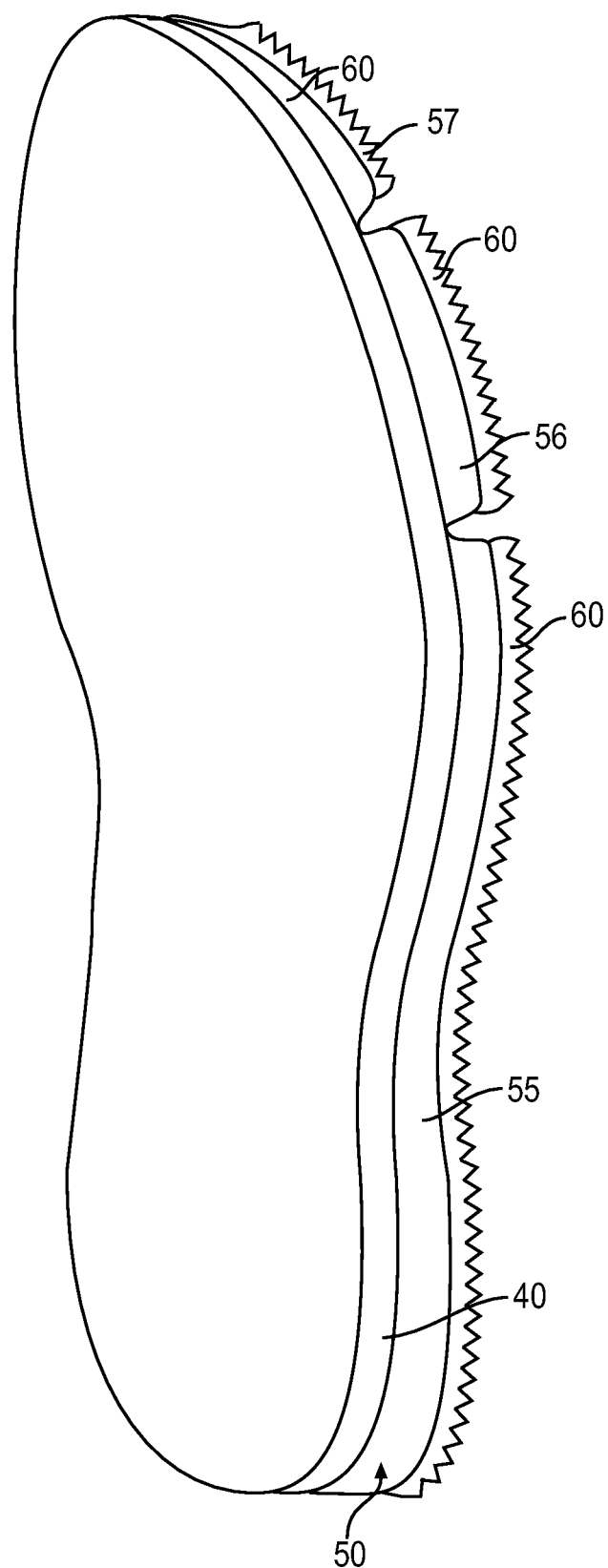
FIG. 6D illustrates the final assembly of the sole structure components after being molded and joined in the mold of FIG. 6A.

The pre-loaded mold halves may then be closed upon a blank 155 of bladder material. As shown in FIG. 6C, blank 155 of bladder material may include two sheets of bladder material. With the application of heat and pressure, blank 155 of bladder material may be formed into a chamber, such as chamber 50, as shown in FIG. 6D. Also, with the application of heat and pressure (in some cases via the inflation of chamber 50 while the mold is closed) reinforcing member 40, chamber 50, and outsole 60 may be joined, and chamber 50 may be shaped. That is, chamber 50 is shaped to have a form that mates with reinforcing member 40 and outsole 60. An exemplary finished sole structure assembly formed using this process is illustrated in FIG. 6D. In some cases, adhesive or hot melt may be used to adhere various components together during this molding process.

This method may be utilized for any of the sole structure configurations disclosed herein. For example, in some cases, the central structure 70 may include a foam support structure 43, which may form a portion of reinforcing member 40, as illustrated in FIG. 6C. In some cases, the central structure may be a tensile member located between the top portion of the chamber and the bottom portion of the chamber, as discussed below regarding other configurations.

Regarding performance, different components of sole structure 30 impart performance characteristics, such as support, stability, attenuation of ground reaction forces (cushioning), or limiting of foot motions, in one or more areas of sole structure 30. In configurations having centrally located support structures, such as foam pillar structures, provide footwear with the benefits of both foam cushioning elements and a fluid-filled chamber. Accordingly, the performance of such footwear may be tuned by modifying the shape and/or size of the reinforcing member, as well as the size and thickness of the chamber and/or the pressure and type of gases with which the chamber is inflated. Not only the shape and dimensions, but also the materials of reinforcing member 40, chamber 50, and outsole 60 may affect the degree to which sole structure 30 attenuates ground reaction forces, imparts stability, and limits foot motions, for example. By varying the shape, dimensions, and/or materials of reinforcing member 40, chamber 50, and outsole 60, therefore, the performance characteristics of footwear 10 may be altered. That is, footwear 10 may be manufactured for different athletic activities by modifying the shape, dimensions, or materials of one or more of reinforcing member 40, chamber 50, and outsole 60.

Variations of the First Sole Structure

Figure 7:
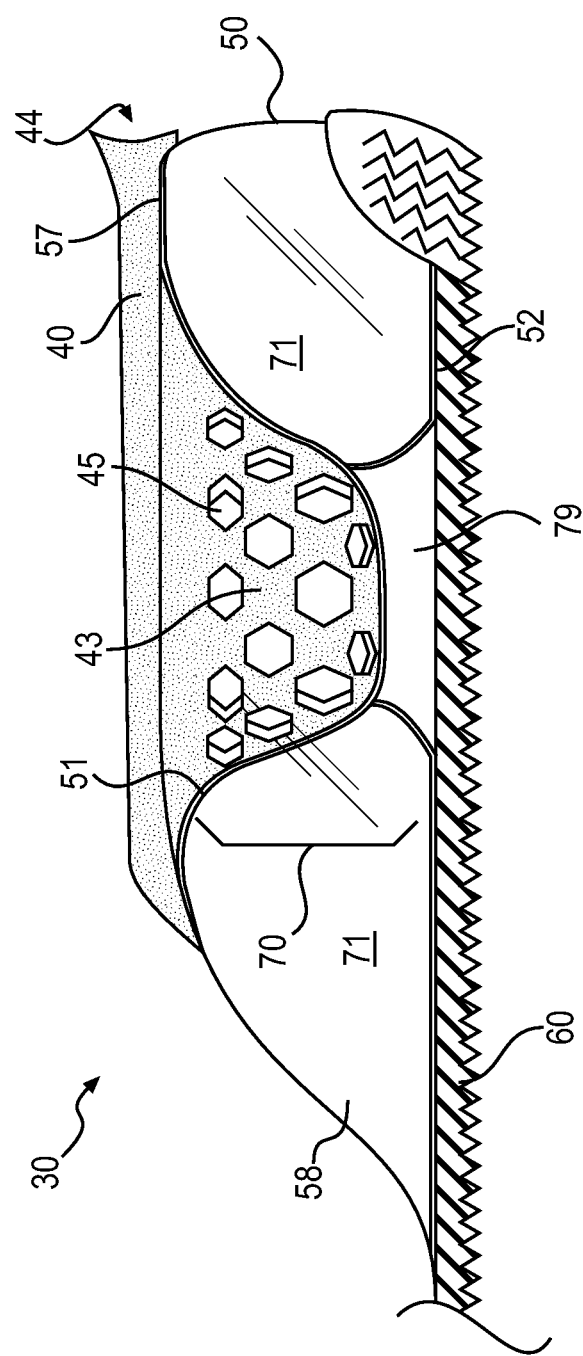
FIG. 7 is a side elevational view of another sole structure including a chamber.

As shown in FIG. 7, in some configurations, support structure 43 of reinforcing member 40 may include a plurality of voids 45. For example, as shown in FIG. 7, voids 45 may provide support structure 43 with a honeycomb structure. Such voids in support structure 43 may serve to lighten reinforcing member 40 and/or may render support structure 43 more compliant, in order to tune performance of sole structure 30. Voids 45 may have any suitable size and/or shape. As shown in FIG. 7, voids 45 may be hexagonal holes or bores. Further, support structure 43 may be hollow in some configurations. In such configurations, voids 45 may form perforations in the shell of support structure 43. In other configurations, support structure 43 may not be hollow, and thus, voids 45 may simply be bores or recesses in support structure 43. As shown in FIG. 7, central structure 70 may include a lower support structure 79. Lower support structure 79 may include a thickened portion of chamber 50, an additional piece of foam column material, or any other suitable material connecting bottom portion 52 to support structure 43. In some configurations, lower support structure 79 may be substantially incompressible. In other configurations, lower support structure 79 may have some degree of compressibility, which may perform in concert with the compressibility of support structure 43.

In some configurations, outsole 60 may wrap upward around the peripheral edges of chamber 50, as shown at the rear portion of sole structure 30 in FIG. 7. Forward portions of outsole 60 in FIG. 7 are shown in cross-sectional view in order to expose central structure 70. By wrapping outsole 60 upward around the peripheral edges of chamber 50, outsole 60 may be further implemented to restrict bulging of chamber 50 from inflation with pressurized fluid. This configuration may also provide added stability as well as other performance benefits.

Figure 8:
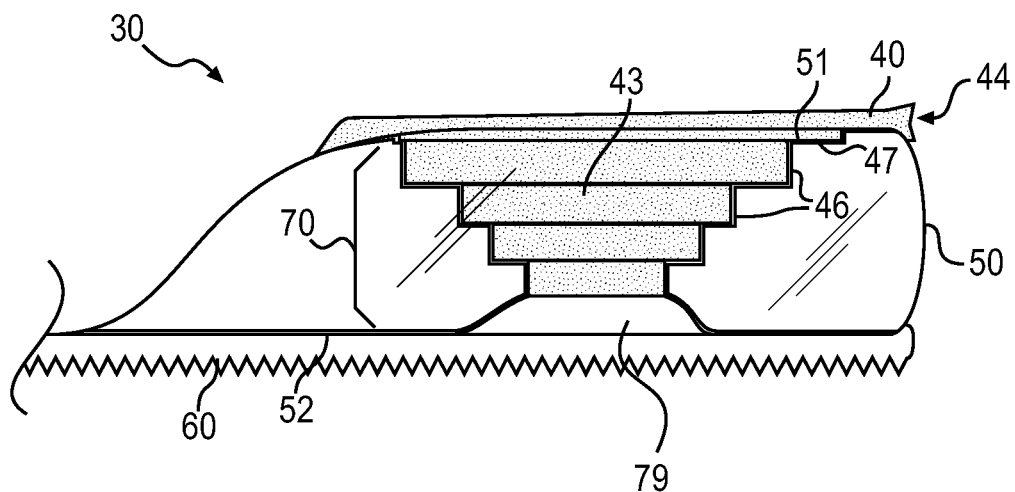
FIG. 8 is a side elevational view of another sole structure including a chamber.
Figure 9:
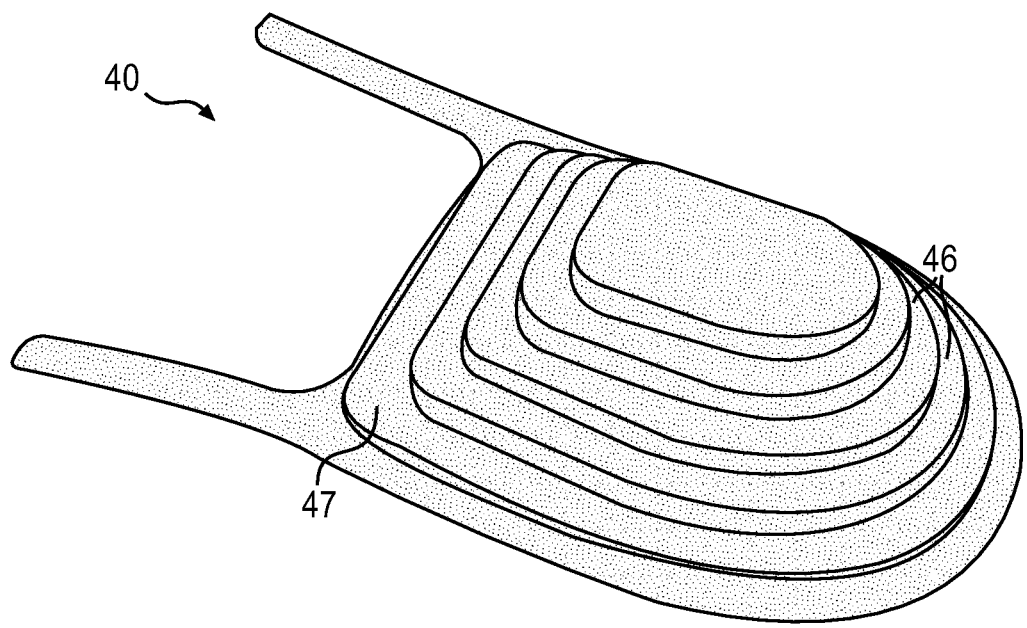
FIG. 9 is a perspective view of the reinforcing member of the sole structure shown in FIG. 8.

As shown in FIGS. 8 and 9, in some configurations, support structure 43 of reinforcing member 40 may have a tiered shape. For example, as shown in FIG. 8, support structure 43 may include a plurality of steps 46, including an upper step 47 adjacent upper portion 44 of reinforcing member 40. In such configurations, support structure 43 may include a plurality of progressively narrower steps extending downward into the recess in top portion 51 of chamber 50. In some configurations, central structure 70 may include lower support structure 79 situated between steps 46 and bottom portion 52 of chamber 50, as shown in FIG. 8.

Figure 10:
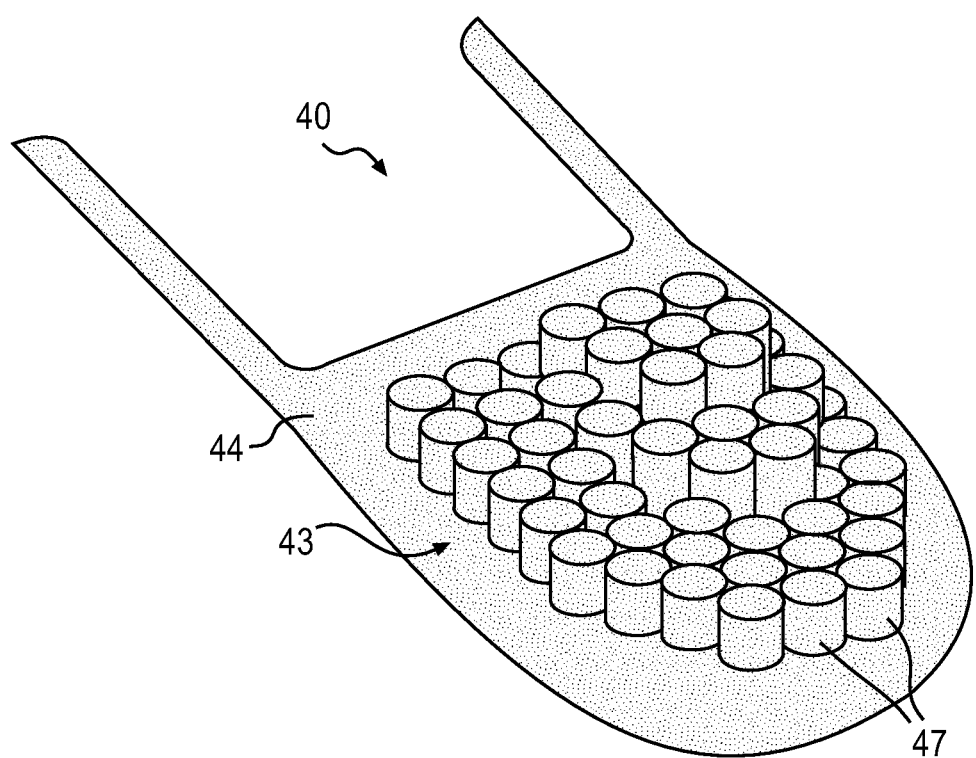
FIG. 10 is a perspective view of another reinforcing member for use in a sole structure.

FIG. 10 illustrates another tiered support structure configuration, similar to that shown in FIGS. 8 and 9. The configuration shown in FIG. 10 implements a plurality of columns 47, having progressively taller heights toward a center portion of support structure 43. Use of individual columns 47, as shown in FIG. 10 may enable more versatility in tuning the support structure, as each column may be sized, shaped, and formed of a material to provide custom performance characteristics. Notably, columns 47 may have any suitable shape, including substantially cylindrical shapes, and non-cylindrical shapes. Substantially cylindrical columns may have a substantially circular horizontal cross-sectional shape. Further, substantially cylindrical columns may also have a substantially consistent horizontal cross-sectional area, top to bottom. Non-cylindrical columns may have non-circular horizontal cross-sectional shapes. Additionally, non-cylindrical columns may have inconsistent horizontal cross-sectional areas, top to bottom.

Tapered or tiered support structure configurations may be tuned to provide progressive compliance under loads. That is, the more such support structures compress, the more load is required to cause the same amount of compression of the support structures. In other words, the support structures may be provided with a progressive spring rate.

With a tapered support structure (see, e.g., FIGS. 4-7), the narrower portion may compress with relatively small amounts of loading. As the loading increases and more and more (and wider and wider) portions of the support structure compress, the amount of vertical compression for a given amount of loading may increase.

For a tiered support structure configuration, such as shown in FIGS. 8-10, the narrowest step may compress first, under relatively small amounts of loading. As more and wider steps compress, increasing amounts of loading will be required to result in the same amount of vertical compression.

This property (progressive spring rate) may be provided with a tapered (or stepped) support structure configuration having a substantially uniform composition of material. However, this progressive spring rate may be further augmented by using different materials for different portions of the support structure, such as different materials for different steps of a tiered support structure. Further, the support structure may be configured with the narrower portion at either the bottom as shown in the accompanying figures, or at the top of the support structure. In still other configurations, an hourglass shaped or barrel shaped (wider in the middle) support structure may be utilized, as discussed below, regarding the configuration shown in FIG. 11.

Figure 11:
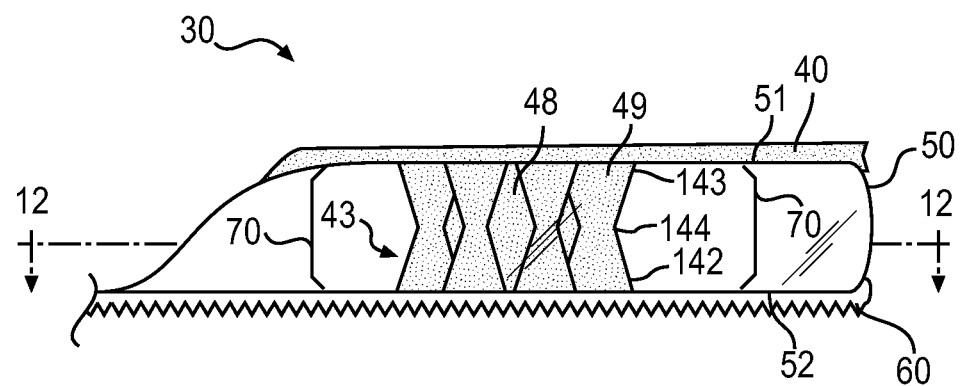
FIG. 11 is a side elevational view of another sole structure including a chamber.
Figure 12:
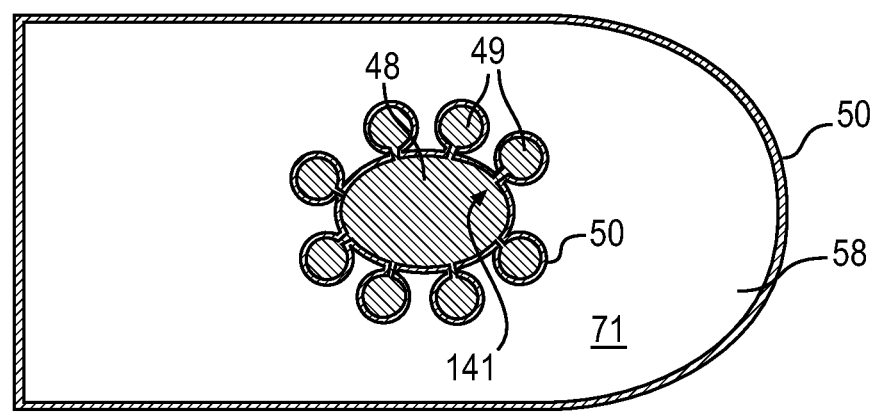
FIG. 12 is a cross-sectional view of sole structure shown in FIG. 11 taken at line 12-12 in FIG. 11.

FIGS. 11 and 12 illustrate another exemplary support structure configuration. As shown in FIGS. 11 and 12, support structure 43 of reinforcing member 40 may have a central member 48 and a plurality of peripheral members 49 that are substantially smaller than central member 48 and arranged around central member 48 and adjacent to central member 48. In some configurations, central member 48 may be substantially cylindrical, whereas in other configurations, central member 48 may have an ovalized cross-sectional shape as shown in FIG. 12. In some configurations, the plurality of substantially cylindrical peripheral members 49 may be attached to central member 48 via a plurality of connecting members 141, as shown in FIG. 12. One or more of peripheral members 49 may have a frustoconical lower portion 142 and an inverted frustoconical upper portion 143, forming a top portion and a bottom portion having a first diameter and a waist portion 144 having a second, narrower diameter, as shown in FIG. 12.

Second Sole Structure Configuration

Figure 13:
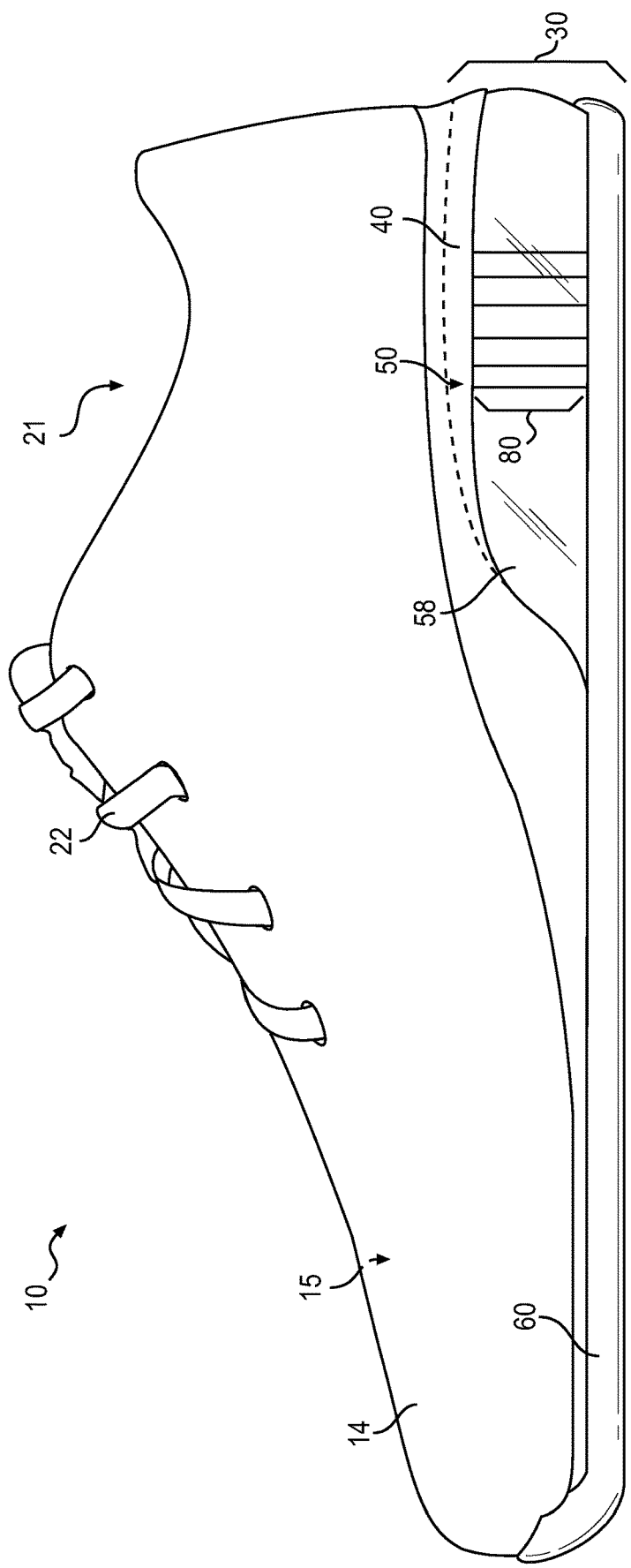
FIG. 13 is a side elevational view of an article of footwear having another sole structure configuration that includes a chamber.
Figure 14:
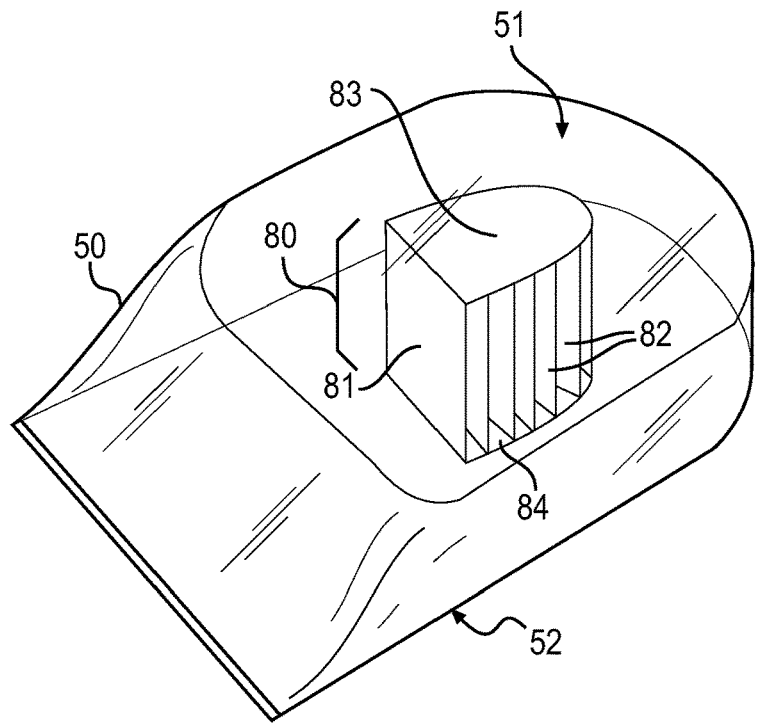
FIG. 14 is a perspective view of a chamber component of the sole structure of the article of footwear in FIG. 13.
Figure 15:
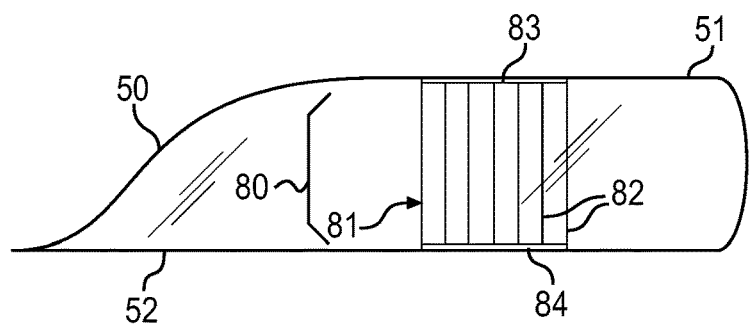
FIG. 15 is a side elevational view of the chamber shown in FIG. 14.
Figure 16:
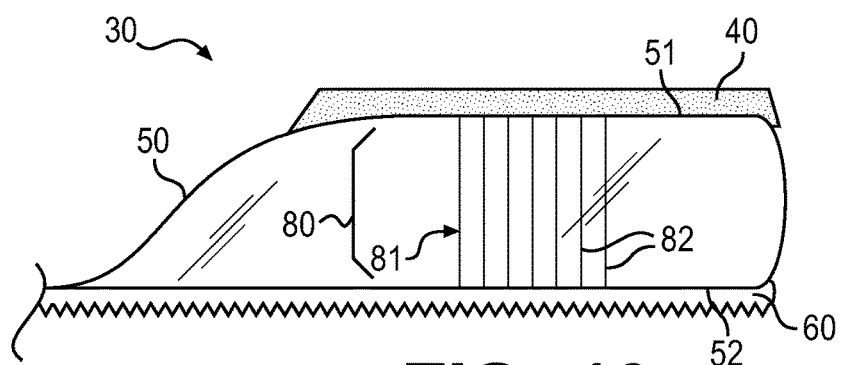
FIG. 16 is a side elevational view of a portion of the sole structure of the article of footwear shown in FIG. 13.

FIG. 13 illustrates an article of footwear 10 including another sole structure 30 implementing a fluid-filled chamber 50. As shown in FIG. 13, footwear 10 may include a central structure 80. As shown in FIGS. 14-16, central structure 80 may include a tensile member 81 extending between top portion 51 of chamber 50 and bottom portion 52 of chamber 50.

Tensile member 81 may have any configuration suitable for limiting the distance between top portion 51 and bottom portion 52 of chamber 50 when inflated. For example, tensile member 81 may have any of the configurations disclosed in Peyton et al., U.S. Pat. No. 8,479,412, issued Jul. 9, 2013, and entitled "Tethered Fluid-Filled Chambers," (now U.S. Patent Application Publication No. 2011/0131831, published Jun. 9, 2011), the entire disclosure of which is incorporated herein by reference. Generally, in some configurations, tensile member 81 may include a plurality of textile slats 82 arranged in a substantially vertical orientation, as shown in FIGS. 14-16. As further shown in FIGS. 14-16, tensile member 81 may further include a top textile panel 83 bonded to top portion 51 of chamber 50, and a bottom textile panel 84 bonded to bottom portion 52 of chamber 50, the textile slats 82 being attached to, and extending between, top textile panel 83 and bottom textile panel 84.

Figure 17:
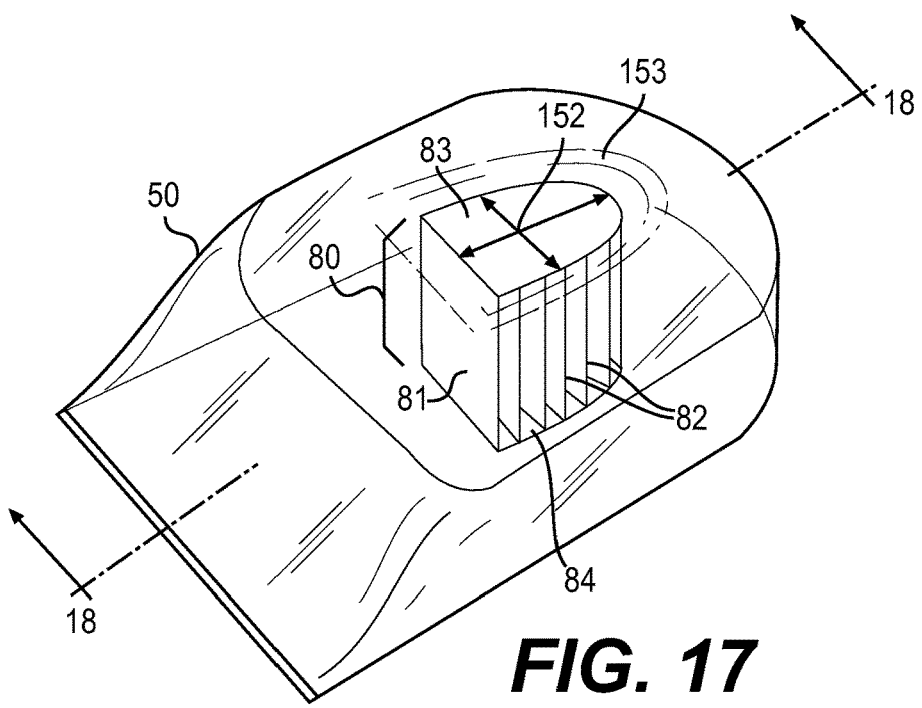
FIG. 17 is a perspective view of another exemplary chamber for use in a sole structure of an article of footwear.
Figure 18:
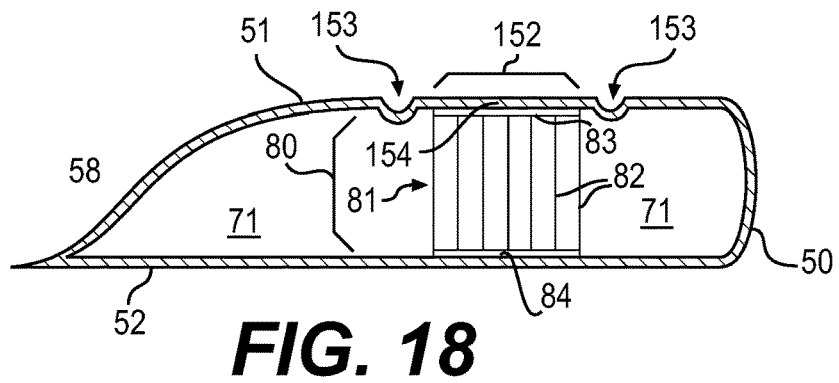
FIG. 18 is a cross-sectional view of the chamber shown in FIG. 17.
Figure 19:
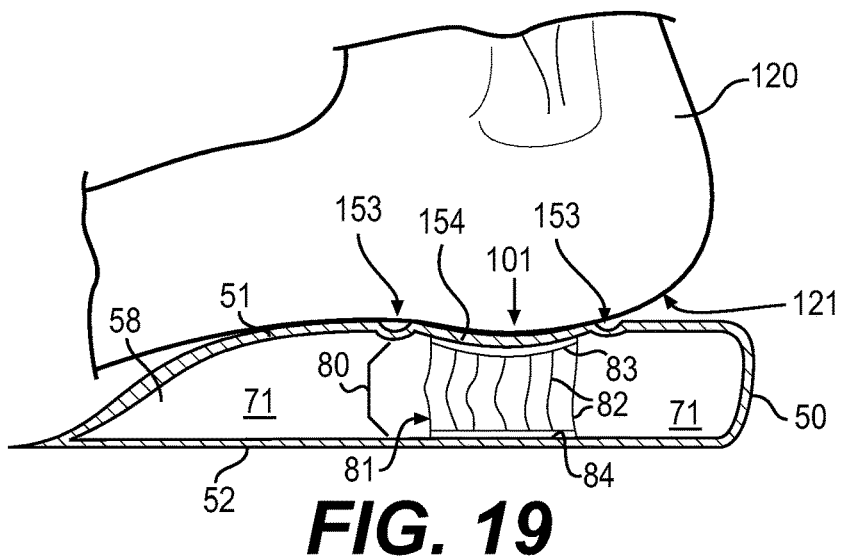
FIG. 19 is a cross-sectional view of the chamber shown in FIG. 18, wherein a top panel of the chamber is in a downwardly deflected position.

FIGS. 17-19 illustrate another chamber configuration that is similar to the configuration shown in FIGS. 14-16. Tensile member 81 (specifically top textile panel 83) contacts top portion 51 of chamber 50 in a contact area 152. In some configurations, as shown in FIGS. 17-19, top portion 51 of chamber 50 may include a groove 153 surrounding contact area 152. Groove 152 defines a central panel member 154 of top portion 51 of chamber 50 and separates central panel member 154 from a surrounding panel of top portion 51 of chamber 50.

As illustrated in FIG. 19, under the load of a heel 120 of a wearer, central panel 154 is configured to deflect downward independent of the surrounding panel of top portion 51 of chamber 50 during an initial loading of central panel member 154. As shown in FIG. 19, when heel 120 exerts a load in a downward direction (shown by an arrow 101), central panel 154 deflects downward. This may provide a progressive compression characteristic, similar to that described above. In addition, this may also provide a recess configured to cradle the heel. Such a cradling recess may provide comfort and lateral stability.

Third Sole Structure Configuration

A sole structure may be provided that utilizes more than one of the central structures described above. For example, more than one type of support structure may be utilized in a stacked configuration. Similarly, more than one tensile member may be stacked to achieve the length desired to span the height of a relatively thick chamber. Further, support structures may be combined with tensile members in a stacked configuration. Such a configuration may provide benefits of both a support structure and a tensile member in a single sole structure. For example, the support structure may provide vertical support in compression. Such support may include cushioning in embodiments where the support structure is compressible. In addition, the tensile member may provide tension between upper and lower portions of the chamber without adding substantial amounts of weight to the sole structure. In some configurations, a relatively thick (e.g., tall) pressurized chamber may be provided with minimal connective structure by stacking multiple connective structures, such as those discussed above.

Figure 20:
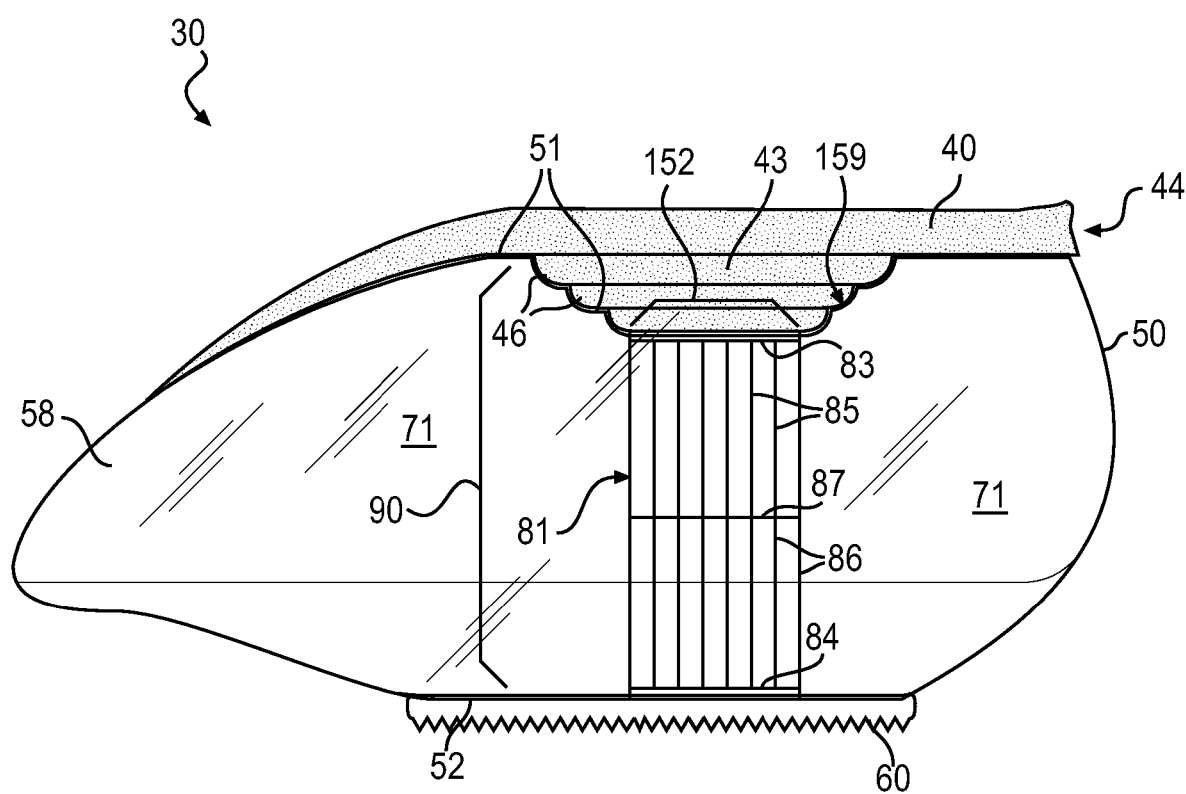
FIG. 20 is a side elevational view of another sole structure configuration for an article of footwear.

FIG. 20 illustrates a relatively thick configuration of sole structure 30 that employs a stepped foam pillar stacked upon two stacked textile tensile members. As shown in FIG. 20, sole structure 30 may include a central structure 90 attached to top portion 51 of chamber 50 in a contact area 152. The area of top portion 51 including contact area 152 extends further downward than other portions of top portion 51 of chamber 50, thus forming a recess 159 in top portion 51 of chamber 50. (See also FIGS. 2 and 3 for a similar configuration.) Reinforcing member 40 may include an upper portion 44 having a lower surface bonded to top portion 51 of chamber 50 and a support structure 43 extending downward from the lower surface into recess 159 in top portion 51 of chamber 50. Support structure 43 substantially fills the recess 159 in top portion 51 of chamber 50. In some configurations, support structure 43 may have a tiered or otherwise tapered configuration, as discussed above. For example, FIG. 20 shows a tiered (stepped) configuration of support structure 43.

As further shown in FIG. 20, central structure 90 may also include a tensile member 81. Tensile member 81 may have a two-layer stacked configuration. For example, as shown in FIG. 20, tensile member 81 may include a top textile panel

83, a bottom textile panel 84, and a middle textile panel 87 located approximately midway between top textile panel 83 and bottom textile panel 84. Tensile member 81 may also include a plurality of textile slats arranged in a substantially vertical orientation. For example, tensile member 81 may include a top set of textile slats 85 extending between top textile panel 83 and middle textile panel 87, and a bottom set of textile slats 86 extending between middle textile panel 87 and bottom textile panel 84.

As discussed above, in some configurations, at least a portion of chamber 50 may constitute an exposed portion of footwear 10. For example, in some configurations, at least medial and lateral side portions of chamber 51 may be exposed, thus making central structure 90 viewable. Such a stacked central structure configuration may be used to form substantially tall chamber embodiments. For example, in some configurations, chamber 50 may have a height of ¾ of an inch to 2 inches, or taller. Such a tall, transparent chamber, with minimal central structure inside the chamber may be used to form a relatively large window to see into and, in some cases, through sole structure 30 of footwear 10.

Such relatively thick chambers may be utilized in any suitable type of footwear. In some configurations, relatively thick chambers (e.g., over one inch in thickness) may be used in footwear having a significant heal. Other implementations may include footwear for high impact activities, where significant shock absorption is desirable. For example, such footwear may include ski and snowboarding boots, particularly those used by athletes who participate in aerial tricks or jumps, resulting in high impact landings. A relatively thick chamber may provide a relatively lengthy amount of travel that the top and bottom portions of the chamber may be compressed toward one another, in order to absorb the forces of large impacts.

The invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

The invention claimed is:

1. An article of footwear having an upper and a sole structure secured to the upper, the sole structure comprising:
   a chamber defining an interior void for receiving a pressurized fluid and including a top portion, a bottom portion, and side portions extending from the top portion to the bottom portion around an entire periphery of the chamber, the side portions including a forward side portion and a rearward side portion opposite the forward side portion, the forward side portion extending from the bottom portion to the top portion at a first angle, and the rearward side portion extending from the bottom portion to the top portion at a second angle different than the first angle, the first angle being acute;
   a central structure located in a central portion of the chamber between opposing side portions of the chamber and defining a recess of the chamber where the top portion is attached to the bottom portion, the chamber being devoid of additional structures in a region surrounding an entirety of the central structure and extending from the central structure to the side portions of the chamber; and wherein, on all sides of the central structure, a dimension of the region between the central structure and the nearest side portion is one third or more of a span across the chamber between opposing side portions; and
   a reinforcing member having an upper portion and a support structure, the upper portion formed from a rigid material, the support structure depending from the upper portion, extending into the recess, and having greater compressibility than the upper portion, the upper portion including a concave surface that receives a convex surface of the top portion of the chamber, the convex surface surrounding an entirety of the recess, wherein the concave surface of the upper portion is bonded to the convex surface of the top portion of the chamber by an adhesive bond or a heat bond.

2. The article of footwear recited in claim 1, wherein the support structure of the reinforcing member includes a plurality of voids.

3. The article of footwear recited in claim 2, wherein the plurality of voids provides the support structure of the reinforcing member with a honeycomb structure.

4. The article of footwear recited in claim 1, wherein the support structure of the reinforcing member has a frusto-conical shape.

5. The article of footwear recited in claim 1, wherein the support structure of the reinforcing member has a tiered shape, having an upper step adjacent the upper portion of the reinforcing member and includes a plurality of progressively narrower steps extending downward into the recess in the top portion of the chamber.

6. The article of footwear recited in claim 1, wherein the support structure of the reinforcing member has a substantially cylindrical central member and a plurality of substantially cylindrical peripheral members that are substantially smaller than the substantially cylindrical central member and arranged around the substantially cylindrical central member and adjacent to the substantially cylindrical central member.

7. The article of footwear recited in claim 6, wherein the plurality of substantially cylindrical peripheral members is attached to the substantially cylindrical central member via a plurality of connecting members.

8. The article of footwear recited in claim 6, wherein one or more of the plurality of substantially cylindrical peripheral members has a frustoconical lower portion and an inverted frustoconical upper portion, forming a top portion and a bottom portion each having a first diameter and a waist portion having a second diameter that is narrower than the first diameter.

9. The article of footwear recited in claim 1, wherein the central structure is provided in at least one of a heel region of the article of footwear and a forefoot region of the article of footwear.

10. The article of footwear recited in claim 1, wherein the chamber is located in a heel region of the article of footwear, and wherein the article of footwear further includes at least a second chamber located in a forefoot region of the article of footwear.

11. The article of footwear recited in claim 1, wherein the chamber is formed of a transparent material.

12. The article of footwear recited in claim 11, wherein at least medial and lateral side portions of the chamber are exposed and the central structure is viewable.

13. The article of footwear recited in claim 1, further comprising an outsole attached to the chamber and including a ground-contacting surface and also including an attachment surface formed on an opposite side of the outsole than the ground-contacting surface.

14. The article of footwear recited in claim 13, wherein the attachment surface is attached to the bottom portion of the chamber.

15. The article of footwear recited in claim 13, wherein the attachment surface is directly attached to the bottom portion of the chamber.

16. The article of footwear recited in claim 13, wherein the bottom portion includes a first surface opposing the top portion and also includes a second surface formed on an opposite side of the bottom portion than the first surface, the second surface being attached to the attachment surface of the outsole.

17. The article of footwear recited in claim 1, wherein the support structure is formed from a material having greater compressibility than the rigid material of the upper portion.

18. The article of footwear recited in claim 1, wherein the support structure is formed from a compressible foam.

19. The article of footwear recited in claim 1, further comprising an outsole attached to the chamber, wherein at least medial and lateral side portions of the chamber are exposed in a space defined between the reinforcing member and the outsole.

20. The article of footwear recited in claim 1, wherein the upper portion is monolithically formed with the support structure.

21. The article of footwear recited in claim 1, wherein the concave surface of the upper portion is bonded directly to the convex surface of the top portion of the chamber.

22. The article of footwear recited in claim 1, wherein the concave surface of the upper portion is adhered directly to the convex surface of the top portion of the chamber.

* * * * *